US012218393B2

(12) United States Patent
Hickey et al.

(10) Patent No.: US 12,218,393 B2
(45) Date of Patent: Feb. 4, 2025

(54) FUEL CELL UTILITY PRODUCT ASSEMBLY

(71) Applicant: Cummins Inc., Columbus, IN (US)

(72) Inventors: Darren B. Hickey, Halfmoon, NY (US); Adam C. Cecil, Columbus, IN (US)

(*) Notice: Subject to any disclaimer, the term of this patent is extended or adjusted under 35 U.S.C. 154(b) by 509 days.

(21) Appl. No.: 17/539,940

(22) Filed: Dec. 1, 2021

(65) Prior Publication Data

US 2023/0170512 A1 Jun. 1, 2023

(51) Int. Cl.
*H01M 8/04* (2016.01)
*H01M 8/04007* (2016.01)
*H01M 8/243* (2016.01)
*H01M 8/2475* (2016.01)
*H01M 8/12* (2016.01)

(52) U.S. Cl.
CPC ....... *H01M 8/243* (2013.01); *H01M 8/04067* (2013.01); *H01M 8/2475* (2013.01); *H01M 2008/1293* (2013.01)

(58) Field of Classification Search
CPC . H01M 8/243; H01M 8/04067; H01M 8/2475
See application file for complete search history.

(56) References Cited

U.S. PATENT DOCUMENTS

| 5,585,205 | A | 12/1996 | Kohchi |
| 7,712,563 | B2 | 5/2010 | Niebuhr |
| 9,461,284 | B2 | 10/2016 | Power |
| 2010/0279166 | A1 | 11/2010 | Tseng |
| 2011/0106294 | A1 | 5/2011 | Bebbington |
| 2014/0272612 | A1* | 9/2014 | Trevisan ........... H01M 8/04014 429/408 |
| 2018/0208069 | A1 | 7/2018 | Lin |
| 2019/0106088 | A1 | 4/2019 | Hayet |
| 2020/0164762 | A1 | 5/2020 | Vidhya |
| 2021/0328238 | A1* | 10/2021 | Cedarleaf-Pavy ...... F28F 3/025 |
| 2023/0317976 | A1* | 10/2023 | Domanski ............. H01M 8/248 |

FOREIGN PATENT DOCUMENTS

WO 2019/085344 5/2019

* cited by examiner

*Primary Examiner* — Olatunji A Godo
(74) *Attorney, Agent, or Firm* — Buckley, Maschoff & Talwalkar LLC

(57) ABSTRACT

The present disclosure generally relates to a fuel cell product assembly comprising a foundational frame assembly comprising a frame rail, a hot box cover removably supported by the foundational frame assembly to define a hot box area, one or more fuel cell assemblies housed in the hot box area and configured to produce electricity, and plumbing configured to supply a fuel or an oxidant to the one or more fuel cell assemblies, wherein at least a portion of the plumbing routes through and is protected by a longitudinal section of the frame rail.

20 Claims, 13 Drawing Sheets

FIG. 8A FRONT VIEW

TOP VIEW

FUEL CELL UTILITY PRODUCT ASSEMBLY

TECHNICAL FIELD

The present disclosure generally relates to systems and methods of configuring and operating a fuel cell based power generating device or apparatus to enable easy access to fuel cell assemblies for servicing, maintenance, and/or repair.

BACKGROUND

A typical fuel cell is comprised of many components and assemblies that may be compressed and bound with a plurality of other fuel cells into a single fuel cell stack. A single fuel cell, one of the many repeating units in the fuel cell stack, is also a multi-component assembly. Fuel cells and/or fuel cell stacks often use hydrogen or hydrogen-rich fuel to generate electricity that may power an application, such as an electric motor or an industrial application. Each fuel cell or fuel cell stack generates electricity through electrochemical reactions between a fuel such as hydrogen and an oxidant containing oxygen.

A fuel cell based power generating device includes one or more fuel cell stacks, and can be situated wherever power is needed. For example, a fuel cell based power generating device can be configured to generate about 200 kW to about 300 kW of power to support a desired application. To supply necessary power, a fuel cell based power generating device may function under different environmental and weather conditions. Typically, fuel cells and fuel cell stacks need to be protected from weather elements (e.g., rain, snow, dust, moisture etc.) to perform effectively and last their full lifetime.

To protect and preserve the life and functionality of a fuel cell and/or fuel cell stack of a fuel cell based power generating device, the device or parts thereof may be protected or covered in an enclosure. These enclosures may also minimize heat loss from fuel cells/stacks that often operate at extremely high temperatures. For example, a solid oxide fuel cell typically operates in the range of about 700° C. to about 1000° C., and typically around 800° C. to about 850° C.

However, any fuel cell based power generating device comprising fuel cells/stacks should be designed such that each fuel cell or stack may be accessed and/or serviced within such an enclosure. Described herein are systems and methods of enclosing and protecting fuel cells and/or fuel cells stacks in a fuel cell based power generating device that is easy to manufacture, assemble, and/or service in order to effectively and consistently produce power on a large scale.

SUMMARY

An embodiment described herein relates to a fuel cell utility product assembly (e.g., solid oxide, PEM, etc.) comprising a foundational frame assembly, a hot box comprising one or more fuel cell assemblies, a power electronics enclosure assembly, a mechanical enclosure assembly, a network of primary air and fuel plumbing, and/or a network of intermediate air and fuel plumbing. The hot box can be surrounded by an insulation cover. The hot box may also include a layer of floor insulation.

The one or more fuel cell assemblies include at least one of a fuel cell stack support base, a heat exchanger assembly, a reformer, or a fuel cell stack. The fuel cell stack support base can be a single cast structure which may be easy to manufacture compared to a multicast structure. The one or more fuel cell assemblies can include one or more isolation devices to prevent heat loss through the fuel cell support base.

The floor insulation can include one or more segmented tiles. The insulation cover can include a one or more seals. The one or more seals may be a temperature seal (e.g., a hot seal) and/or a weather seal.

In an embodiment, at least two fuel cell assemblies are plumbed in parallel. The foundational frame assembly can include first and second "C"-shaped rails. The primary plumbing can be housed in or supported by the first and the second "C"-shaped rails. One or more primary air control valves or one or more primary fuel control valves can be housed in or supported by the first and the second "C"-shaped rails.

In an embodiment, the insulation cover comprises an inner hot box structure, a cover insulation, and an outer hot box shell. The insulation cover can be attached to two side insulation walls or, the insulation cover can be attached to or configured to include a roof (e.g., the top portion of the insulation cover). The insulation cover can include or attach to a roof and two side insulation walls.

The insulation cover can include an integral lifting mechanism configured to lift the insulation cover vertically off of the hot box without damaging any seals (e.g., the temperature or water seals). The lifting mechanism includes one or more wheel assemblies, which can enable the insulation cover to move in one or more directions, such as horizontally in either direction, without removing panels of the insulation cover.

Embodiments employing a fuel cell utility product assembly can include one or more bus bars, which may be made of a high temperature material. The high temperature material may engage with the fuel cell assemblies within the hot box and transition to a lower temperature material outside the hot box.

Power systems can include more than one fuel cell utility products positioned end-to-end in a row. Horizontal movement of the insulation cover of one of the fuel cell utility products can provide access to the hot box and/or, the horizontal movement of the insulation cover over a neighboring fuel cell utility product assembly can be configured to not block inlet or outlet vents or prevent operation of the neighboring fuel cell utility product. A layout of the multiple fuel cell utility product assemblies can include service pathways.

Another embodiment described herein relates to a hot box assembly comprising a hot box surrounded by an insulation cover and a layer of floor insulation, an integral lifting mechanism, a weather seal, and a temperature seal. The insulation cover can move horizontally to enable access to one or more fuel cells in the hot box. The weather seal is configured to seal the insulation cover to a supporting structure on which the hot box is placed or connected. The temperature seal is configured to seal one or more insulation interfaces of the hot box from the surrounding. The insulation cover includes a roof and one or more (e.g., two) side walls. The hot box assembly can be part of or employed in a fuel cell utility product assembly.

Another embodiment described herein relate to a fuel cell assembly comprising a fuel cell stack, a fuel cell stack support base, and at least one thermal isolation devices including at least one mounting point of the fuel cell assembly. The fuel cell assembly is attachable to a frame at each mounting point when employed. The fuel cell assembly can comprise solid oxide fuel cells employed in a fuel cell utility product assembly.

Another embodiment described herein relates to a (solid oxide) fuel cell utility product assembly comprising a power electronics enclosure assembly, a mechanical enclosure assembly, and a hot box. The power electronics enclosure assembly is configured separate from the mechanical enclosure assembly. The hot box assembly can include a lower insulation comprising segmented insulation tiles.

The (solid oxide) fuel cell utility product assembly can include a bus bar comprising high temperature resistant material in the hot box, and a bus bar transition comprising a different material, such as a relative low temperature resistant material, located outside the hot box.

Another embodiment described herein relates to a (solid oxide) fuel cell utility product assembly comprising two or more fuel cell assemblies, and a hot box. The two or more fuel cell assemblies can be located in the hot box and can be plumbed in parallel. The (solid oxide) fuel cell utility product assembly can include a foundational assembly comprising a first main frame and a second main frame. The (solid oxide) fuel cell utility product assembly can include a primary air plumbing, which includes an air flow path from the first main frame to the second main frame. Alternatively, the primary fuel plumbing can be located within the first main frame or the second main frame.

In another embodiment, the fuel cell utility product assembly comprises primary air controls and/or primary fuel controls within the first main frame or the second main frame. The hot box can include a scavenging tube connecting inside of the hot box to a primary air outlet duct.

Another embodiment described herein relates to a system of fuel cell utility product assembly comprising more than one fuel cell utility product assemblies. The more than one fuel cell utility product assemblies are position end-to-end in a row, each fuel cell utility product assemblies has a hot box insulation cover, an air inlet and an air outlet configured to allow continuous operation of a first fuel cell utility product assembly while the hot box insulation cover of the second fuel cell utility product assembly is in a service position. The more than one fuel cell utility product assemblies can be positioned end-to-end with service pathways parallel or perpendicular to the more than one fuel cell utility product assemblies.

BRIEF DESCRIPTION OF THE DRAWINGS

FIG. 8A is an illustration showing the front view of one embodiment of intermediate plumbing.

Figure 1:
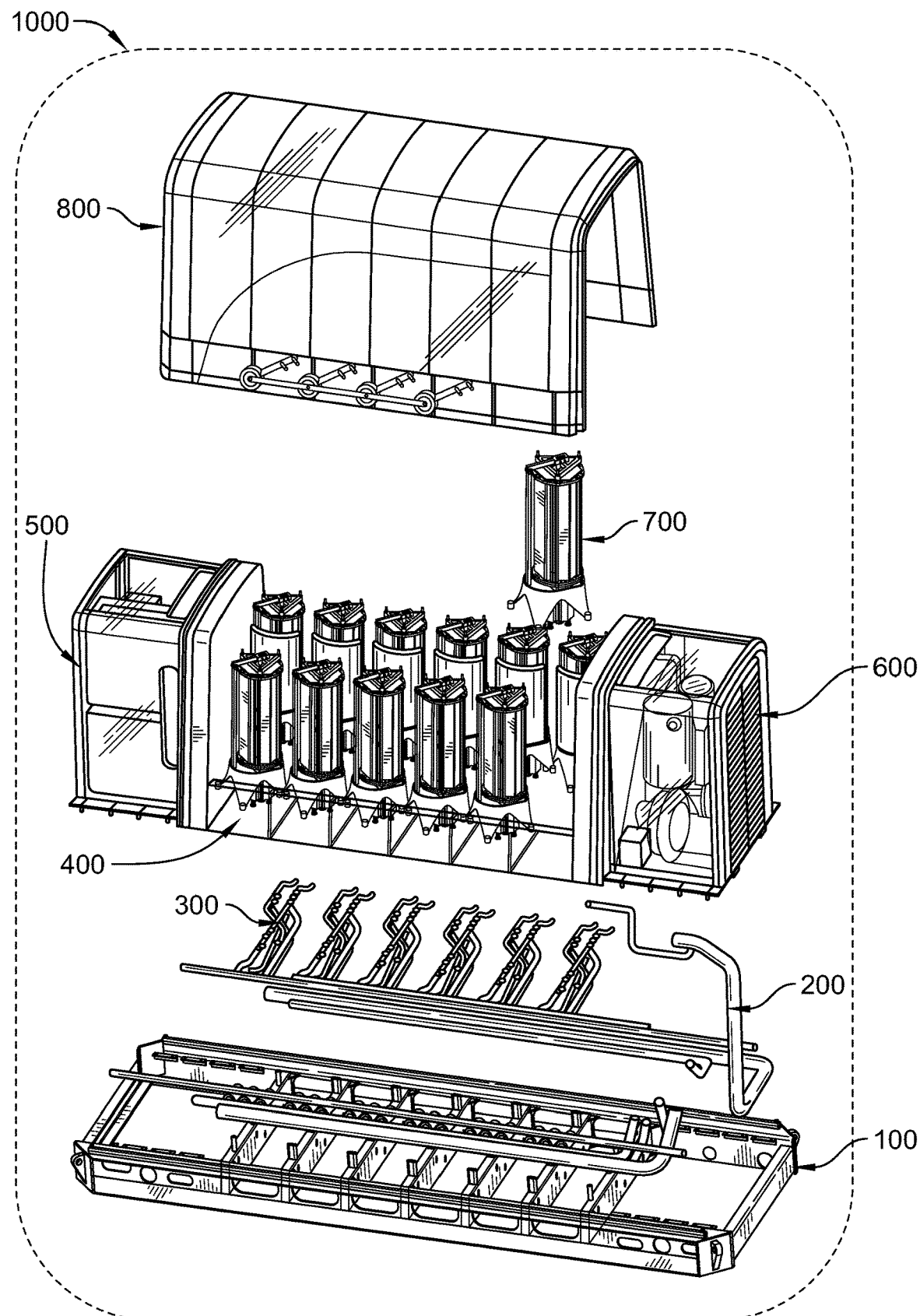
FIG. 1 is an exploded perspective view of an embodiment of a fuel cell utility product—assembly of the present disclosure.

These and other features, aspects, and advantages of the present invention will become better understood when the following detailed description is read with reference to the accompanying drawings described herein. Reference is also made to the accompanying drawings that form a part of the present disclosure and shown by way of illustration of specific embodiments in which the invention may be practiced. These embodiments are described in sufficient detail to enable those skilled in the art to practice what is claimed and are not limiting. Instead, it is to be understood that other embodiments may be utilized and that logical, mechanical, and electrical changes may be made without departing from the spirit and scope of the invention and/or claims.

DETAILED DESCRIPTION

The present disclosure is directed to systems and methods of enclosing a fuel cell or fuel cell stack in a fuel cell based power generating device, apparatus, or system that is protected from degrading or deteriorating elements. Specifically, the present disclosure is directed to a fuel cell based power generating device or system that is easy to manufacture, assemble, and/or service. The present disclosure is also directed to systems and methods of preventing thermal loss from an enclosure housing comprising more than one fuel cell or fuel cell stack. The present disclosure is further directed to configuring and operating one or more fuel cell based power generating devices to produce large amounts of power in order to support large-scale applications.

The fuel cell based power generating device of the present disclosure may comprise one or more fuel cell stacks. The fuel cell based power generating device of the present disclosure may comprise one or more fuel cell systems. The fuel cell stack and/or fuel cell system may comprise one or more fuel cells.

The one or more fuel cells of the present disclosure may include, but are not limited to, a phosphoric acid fuel cell (PAFC), a molten carbonate fuel cell (MCFC), a proton exchange membrane fuel cell (PEMFC), and a solid oxide fuel cell (SOFC). In at least one embodiment, the fuel cell is a SOFC. In at least one exemplary embodiment, each fuel cell of the one or more fuel cells is a SOFC.

The fuel cell based power generating device or system of the present disclosure, and many of the components described herein, could benefit any type of fuel cell or fuel cell system. However, particular benefits related to thermal regulation and preservation of the fuel cell, which is necessary for optimal fuel cell function and operation, is provided to SOFCs that operate at high temperatures (800° C. to about 1000° C.) by components of the fuel cell based power generating device (e.g., a hot box area 824, a hot box 802, an insulation cover 800). Since PEMFC and other types of fuel cells do not operate at high temperatures such that thermal conservation is not such a concern, these fuel cells more readily benefit from the proximity and location of the electrical or electronics power plants and mechanical plants, as well as the plumbing architecture of the fuel cell based power generating device or system.

The fuel cell based power generating device, apparatus, or system of the present disclosure includes a fuel cell utility product assembly 1000, such as a hot box assembly 1000, as shown in FIG. 1. The fuel cell utility product assembly or hot box assembly 1000 includes a foundational frame assembly 100, a network of primary or main plumbing 200, a network of intermediate plumbing 300, a layer of floor insulation 400, a power electronics enclosure assembly 500, a mechanical enclosure assembly 600, a plurality of fuel cell assemblies 700, and an insulation cover 800 (e.g., a hot box insulation cover 800). In other embodiments, the fuel cell utility product assembly 1000 may comprise lesser components or more additional components.

The eight major components 100, 200, 300, 400, 500, 600, 700, and/or 800, in any combination, serve as the major building blocks that may be used for manufacturing the fuel cell utility product assembly 1000 at a high volume production. Alternatively, one or more of these individual major components 100, 200, 300, 400, 500, 600, 700, and/or 800 may be pre-assembled individually and then assembled to form the larger fuel cell utility product assembly 1000

The entire fuel cell utility product assembly 1000, including any one or more of components 200-800, may be built upon the foundational frame assembly 100. Components of the fuel cell utility product assembly 1000 (e.g., 200-800) may be coupled, attached, or otherwise connected, such as through fasteners (e.g., bolts, rivets, screws, etc.), welding (e.g., laser, MIG, TIG, etc.), latches, or any other methods or combinations thereof, to the foundational frame assembly 100. The foundational frame assembly 100 may be made of and/or comprise any structural material known in the art to be used for foundational support, including but not limited to, metal (e.g., steel), composite, concrete, rebar, and/or combinations thereof.

In one exemplary embodiment, the foundational frame assembly 100 is made of structural steel. The foundational frame assembly 100 may be a unitary or single element or component. Alternatively, the foundational frame assembly 100 may include multiple foundational frame components, such as those shown in FIG. 2A, coupled together to create a single foundational frame 100 structure. The foundational frame assembly 100 may also comprise foundational reinforcing components tailored to specific applications for desired strength and/or durability targets.

Foundational reinforcing components, such as gussets and/or stiffening ribs (not shown), may be coupled to the foundational frame assembly 100. These foundational reinforcing components may comprise similar or different material as the foundational frame assembly 100 (e.g., steel or concrete), such as to increase or reinforce the strength of the foundational frame assembly 100. These foundational reinforcing components may be located and/or attached to the frame assembly 100 in specific or particular areas, such as corners and structural transitions, to support the full weight of the present fuel cell utility product assembly.

Figure 2:
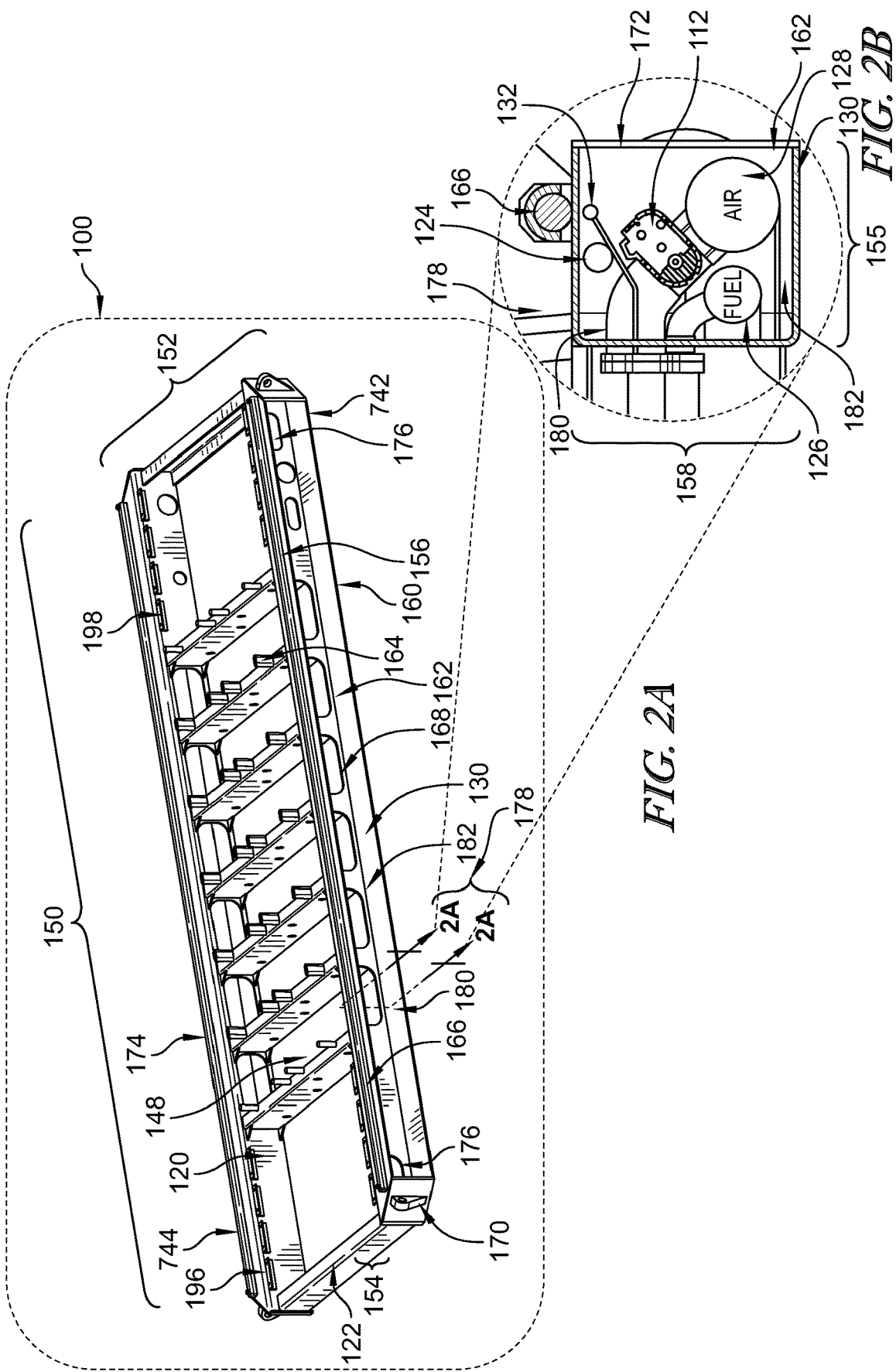
FIG. 2A is an illustration showing different components of an embodiment of a foundational frame assembly.
FIG. 2B is a cross-sectional view taken along line 2A-2A in FIG. 2A showing the components comprised in the foundational frame assembly, as shown in FIGS. 1 and 5.

The size of the foundational frame assembly may be any size or length necessary to support fuel cell assemblies 700 needed to meet the desired or requested power demand Referring to FIG. 2A, in one illustrative embodiment, the dimensions of the foundational frame assembly 100 may be about 5.7 m in length, about 2.2 m in width, and about 0.3 m in height. In one embodiment, the length 150 of the foundational frame assembly 100 may range from about 1 m to about 10 m. In one embodiment, the width 152 of the foundational frame assembly 100 may range from about 1 m to about 5 m. In one embodiment, the height 154 of the foundational frame assembly 100 may range from about 0.1 m to about 0.5 m.

The foundational frame assembly 100 may comprise one or two, at least two, about two, or two or more frame rails 130 and 120. As shown in FIG. 2A, the assembly 100 includes a first frame rail 120 and a second frame rail 130. The second frame rail 130 is offset from and generally parallel to the first frame rail 120.

Each frame rail 130, 120 may have a "C" shape, such that its cross-sectional area 178 also defines a "C"-shaped channel 180, as shown in FIGS. 2A and 2B. To form this "C"-shaped channel 180, each frame rail 130, 120 may include a top ledge 156, a main body 162, and a bottom ledge 160 that span the full length of both sides of the foundational frame assembly 100. A "C"-shaped cross-sectional channel 180 along the longitude of the frame assembly 100 is created For example, each frame rail 130 and 120 may comprise an extruding top ledge 156, an indented main body 162, and an extruding bottom ledge 160 where the extruding top ledge 156 and the extruding bottom ledge 160 span either side of the foundational frame assembly 100 in order to form the "C"-shaped channel 180 therebetween.

In one embodiment, shown in FIGS. 2A and 2B, the extruding top ledge 156 and the extruding bottom ledge 160 extend outward or outboard away from the indented main body 162 along both sides of the foundational frame assembly 100 in order to form the "C"-shaped channel 180 within the indented main body 162 comprising a cross-section 2A-2A 178. Referring to FIG. 2B, in some embodiments, the "C"-shaped frame rails 130 and 120 may allow another component/element to be nested within the cross-section 178 of the indented main body 162, such as within the "C"-shaped channel 180.

The "C"-shaped channel 180 and/or cross-section 178 defines an open longitudinal section along and within the frame assembly 100 that facilitates serviceability of all assembly 1000 components in the field, such that the fuel cell utility product assembly 1000 does not have to be disassembled for service. Specifically, the "C"-shaped channel 180 may have channel openings 182 where valves (e.g., control valves), wiring, fuel or air supply components from the primary plumbing 200 and/or intermediate plumbing 300 may be accessed. In some embodiments, the channel gaps or channel openings 182 are covered by frame rail cover plates 172 that prevent direct access and therefore protect components (e.g., valves, wiring, etc.) inside the channel gaps or channel openings 182.

Similarly, a main or primary air plumbing 128 and/or a main or primary fuel plumbing 126 may be nested within the cross-section 178 of the indented main body 162, as shown in cross-section 2A-2A 178 of FIG. 2B. Such an embodiment provides structural benefit in that the fuel cell utility product assembly 1000 has a reduced physical footprint since the plumbing and other components are integrated within the foundational frame assembly 100.

Referring to FIG. 2B, in one embodiment, the length 150 of the cross-section 2A-2A 178 may range from about 1 m to about 10 m. In one embodiment, the width 155 of the cross-section 2A-2A 178 may range from about 0.1 m to about 0.5 m. In one embodiment, the height 158 of the cross-section 2A-2A 178 may range from about 0.1 m to about 0.5 m. In one embodiment, the length 158 and width 155 of the cross-section 2A-2A 178 may be the same.

For example, the "C"-shaped frame rails 130 and 120 may enable easy assembly and service of electronic control components. Exemplary electronic control components may comprise those configured to control the main air plumbing 128, the main fuel plumbing 126, fuel gas plumbing 132, and the one or more fuel and air control valves 112. The one or more fuel or air control valves 112 may be located within the "C"-shaped channel 180 of the indented main body 162, as shown in FIG. 2B, of the frame rails 130 and 120.

Further, one or more electrical conduits 124 may be routed within the "C"-shaped cross-section 178 of the frame rails 130 and 120. Such electrical conduit(s) 124 may connect inputs and outputs of various sensors and actuators to a control system. Additional or other types of electrical or fluid piping, wiring, tubing, channeling components may also be integrated into the "C"-shaped cross-section 178 of the frame rails 130 and 120.

The control valves 112 for air and fuel may be located on opposite sides of the foundational frame assembly 100. For example, the control valves and/or plumbing for air 128 may be comprised within the "C"-shaped channel 180 of the indented main body 162 of a first (e.g., a left) frame rail 120, while the control valves and/or plumbing for fuel 126 may be comprised within the "C"-shaped channel 180 of the indented main body 162 of a second (e.g., a right) frame rail 130 or vice versa. Such placement may enhance the packaging, ease of assembly and service of fuel cells comprised within the fuel cell utility product assembly 1000, while reducing the physical footprint of the assembly.

The number of cross members 122 may be tailored based on the number, size, and/or weight of fuel cell assemblies 700 comprised in the fuel cell utility product assembly 1000 and/or the length of the foundational frame assembly 100. As shown in FIG. 2A, the foundational frame assembly 100 includes an end cross member 122, which interconnects each pair of ends of the frame rails 130, 120, and seven interior cross members 122 provided between the two end cross members 122 and interconnecting the frame rails 130, 120 at separate locations. However, for other embodiments, the foundational frame assembly 100 may comprise any number of frame cross members 122.

In another embodiment, the foundational frame assembly 100 may comprise about 1 to about 20 frame cross members 122, including any number comprised therein. In an exemplary embodiment, the foundational frame assembly 100 may comprise about 2 to about 10 frame cross members 122. In other embodiments, the assembly 100 may comprise about 6 to about 11 cross members 122, such as about 2, 3, 4, 5, 6, 7, 8, 9, 10, or about 11 frame cross members 122. The frame cross members 122 may couple the "C"-shaped frame rails 130 and 120 together in a "ladder" like construction (see FIG. 2A).

The foundational frame assembly 100 may comprise one or more lifting locations 170, which may be used to hoist the entire fuel cell utility product assembly 1000 during transportation and/or installation at a plant site, such as a customer or user site. As shown in FIG. 2A, the foundational frame assembly 100 includes four lifting locations 170, each located in a corner proximate to interconnected ends of one frame rail 130, 120 and one cross member 122. Each lifting location 170 includes a hook, loop or similar feature for attaching an object (e.g., chain, rope, etc.) to support the assembly during movement. In other embodiments, the frame assembly 100 may include any number of lifting locations, which may be positioned at one or more corners, along one or more sides (e.g., proximate one or more centers), and/or any other location of the frame assembly 100.

The foundational frame assembly 100 may comprise one or more pass-through openings 168 located in one or more rails or members, such as the "C"-shaped frame rails 130 and 120. Such pass-through openings 168 are configured to allow air and fuel plumbing to pass from inside the cross-section 2A-2A 178 of the "C"-shaped frame rails 130 and 120 (see, e.g., FIG. 2B) to the internal space 148 of the foundational frame assembly 100 or vice versa. For example, the pass-through openings 168 allow plumbing within the internal space 148 between two consecutive cross members 122 and/or within the cross-section 2A-2A 178. The pass-through openings may be any shape, including rectangular, square, oblong, oval, and/or circular.

Therefore, the size of the pass-through openings 168 is determined by the size of the plumbing (e.g., intermediate or primary plumbing) that must traverse the pass-through opening. The pass-through openings 168 may extend the full length between two consecutive cross members 122. For example, the size of the pass-through openings 168 may range from about 0.2 m to about 0.5 m, including any length comprised therein. In other embodiments, the size of the pass-through openings 168 may be less than the length between two consecutive cross members 122. The size, shape, and location of the pass-through openings should be designed to ensure that integrity and strength of the foundational frame assembly 100 is maintained and able to support the weight of the fuel cell utility product assembly 1000 and its components.

The embodiment shown in FIG. 2A includes a pass-through opening 168 between every pair of consecutive cross members 122. In other embodiments, the foundational frame assembly 100 may not include a pass-through opening 168 between one or more pairs of select consecutive cross members 122. In further embodiments, the foundational frame assembly 100 may include one or more pass-through openings 168 only on one side of the frame rail (e.g., frame rail 120 or 130), or may include at least one pass-through opening 168 on each side (e.g., in each frame rail 120 and 130) The foundational frame assembly 100 may also comprise portals 176 to access the customer connections to the power electronics enclosure assembly 500 and/or the mechanical enclosure assembly 600.

The primary or main plumbing 200 and the intermediate plumbing 300 have distinct purposes. The primary plumbing 200 runs the length of the foundational frame assembly 100 in order to connect and provide air and fuel to all of the fuel cell stacks in the fuel cell utility product assembly 1000 from one or more manifolds 742 and 744. The intermediate plumbing is located within each fuel cell stack 700, and are positioned and located perpendicular to the foundational frame assembly 100 in order to connect into one or more manifold (e.g., an inlet manifold 742 or an outlet manifold 744).

The design and layout of the primary or main plumbing 200 in relation to the intermediate plumbing 300 within the foundational frame assembly 100 have distinct benefits. In addition to being housed within the foundational frame assembly 100 and its "C"-shaped cross-section 178, the design and layout of the primary plumbing 200 in relation to the intermediate plumbing 300 is simple or uncomplicated, meaning fuel and air plumbing is separately routed into and out of the fuel cell stack assemblies 700 to exhaust. The fuel and air plumbing of the primary plumbing 200 and intermediate plumbing 300 layout within the foundational frame assembly 100 provide the necessary balanced and uniform input of fuel and air to the fuel cell stack or assembly 700 to ensure proper function of the fuel cell.

In some embodiments, the fuel and air plumbing and/or the main or primary plumbing 200 and intermediate plumbing 300 do not intersect, cross, or overlap with one another. Specifically, the plumbing design incorporates a single inlet or inlet manifold 742 for fluids (e.g., air and fuel) and gases on one side of the foundational frame assembly 100 and a single outlet or outlet manifold 744 on the opposite side of the foundational frame assembly 100 to exhaust fluids. Importantly, the primary plumbing 200 is responsible for delivering the fluids to the fuel cell stack or assembly 700. The intermediate plumbing 300 is responsible for doing the necessary splitting, overlapping, or crossover to balance fluids and heat within the fuel cell assembly 700 to allow proper function of the fuel cell.

This modular design of the primary plumbing 200 and intermediate plumbing 300 enables easy changes or modification of the number of fuel cell assemblies 700 to increase or decrease without having to change the plumbing design within the fuel cell utility product assembly 1000. Since the intermediate plumbing 300 remains the same for all fuel cell stacks 700, addition or removal of fuel cell assemblies 700, such as the linear stacking or array of fuel cell assemblies 700, remains constant and does not require plumbing redesign or further plumbing considerations for proper fuel cell function. Therefore the present fuel cell utility product assembly 1000 enables a simplistic, modular, stackable, and/or scalable configuration to house and protect variable number of fuel cell assemblies 700 based on their size and weight.

Referring to FIG. 1, in some embodiments, placing the primary plumbing 200 inside the foundational frame assembly 100 may protect the primary plumbing 200 from potential damage during transportation and/or operation. Placing the intermediate plumbing 300 between the foundational frame assembly 100 and the floor insulation 400 may also protect the intermediate plumbing 300 from potential damage during transportation and/or operation.

A frame rail cover plate 172 may engage with the frame rails 120 and 130 of the foundational frame assembly 100 to protect and seal the components housed within the "C"-shaped frame rails 130 and 120. The frame rail cover plates 172 may cover the pass-through openings 168 and/or portals 176 (individually or collectively). The frame rail cover plates 172 may be easily removable for servicing any component of the fuel cell utility product assembly 1000 located within the indented main body 162 of the frame rails 120 and 130.

The "C"-shaped frame rails 130 and 120 of the foundational frame assembly 100 may comprise one or more mounting brackets 196 and 198. The mounting brackets 196 and 198 are configured to engage with the power electronics enclosure assembly 500 and/or the mechanical enclosure assembly 600 and secure them to the foundational frame assembly 100. More specifically, the power electronics enclosure assembly 500 and/or the mechanical enclosure assembly 600 may be coupled to the mounting brackets 196 and 198 to secure those components to the foundational frame assembly 100.

The foundational frame assembly 100 may comprise one or more mounting stands 164. As shown in FIG. 2A, a plurality of mounting stands 164 are positioned atop each cross member 122. However, the assembly can include any number of mountings stands 164 (e.g., 1, 2, 12, 28, etc.) located on any cross members 122 or other structure of the frame assembly. The one or more mounting stands 164 may engage with one fuel cell, fuel cell stack, fuel cell system, or fuel cell assembly 700 to securely position the fuel cell assembly 700 onto the foundational frame assembly 100.

The one or more mounting stands 164 may elevate the one or more fuel cell assemblies 700 above, away from, and/or off of the cross members 122 in order to allow room for other components, such as the floor insulation 400. For example, in some embodiments, a layer of the floor insulation 400 lies between the fuel cell assembly 700 and the cross members 122 of the foundational frame assembly 100. Specifically, a layer of floor insulation 400 may be located on top of the foundational frame assembly 100 and below the one or more fuel cell assemblies 700.

In some embodiments, the foundational frame assembly 100 may comprise one or more mounting stands 164 on each cross member 122. In some embodiments, the foundational frame assembly 100 may comprise about 1 to about 6 mounting stands 164 on each cross member 122, including any number of mounting stands comprised therein. In other embodiments, the foundational frame assembly 100 may comprise a different number or any number of mounting stands 164 on different cross members 122.

Figure 3:
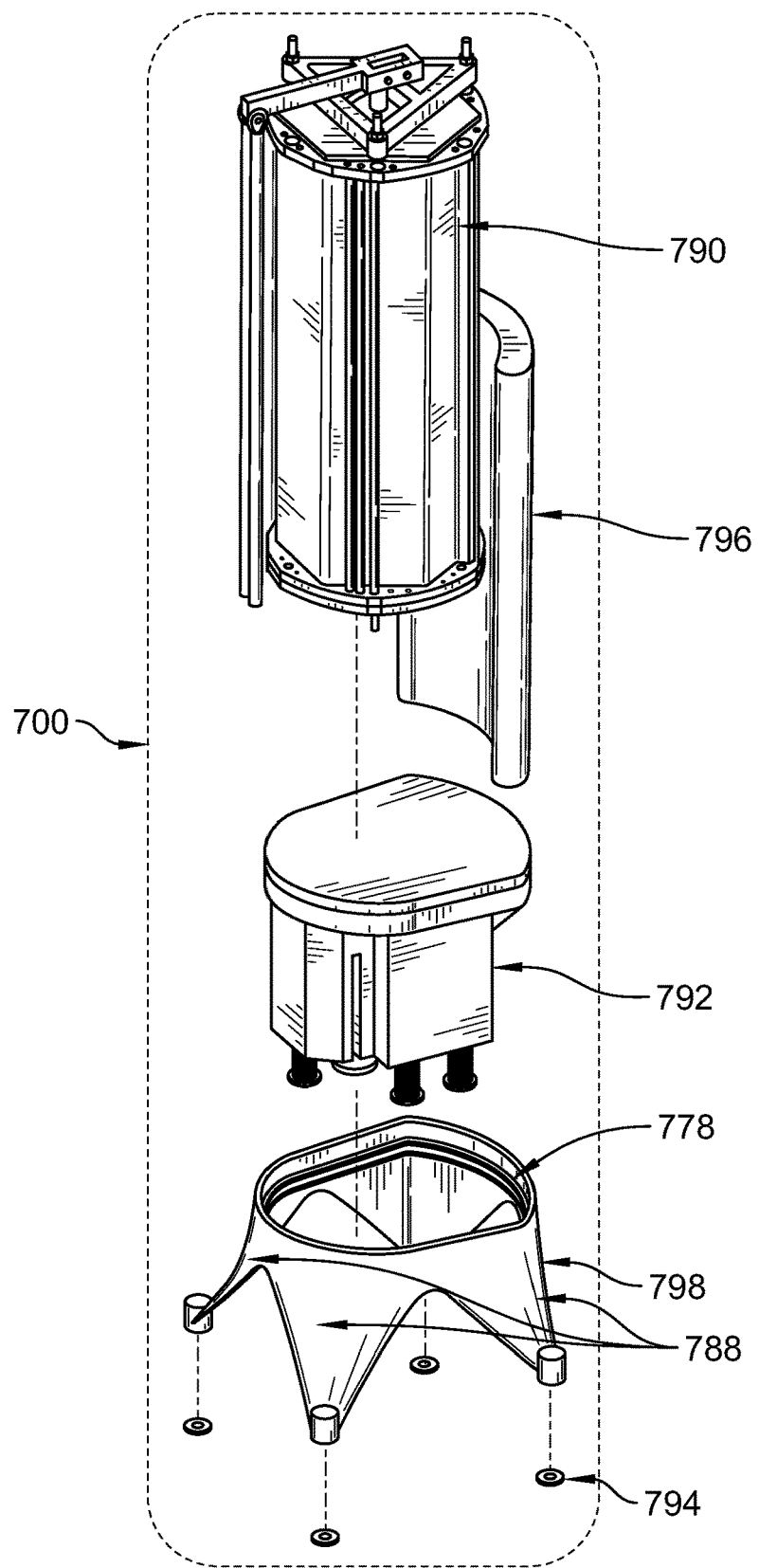
FIG. 3 is an exploded perspective view showing an embodiment of a fuel cell assembly.
Figure 7:
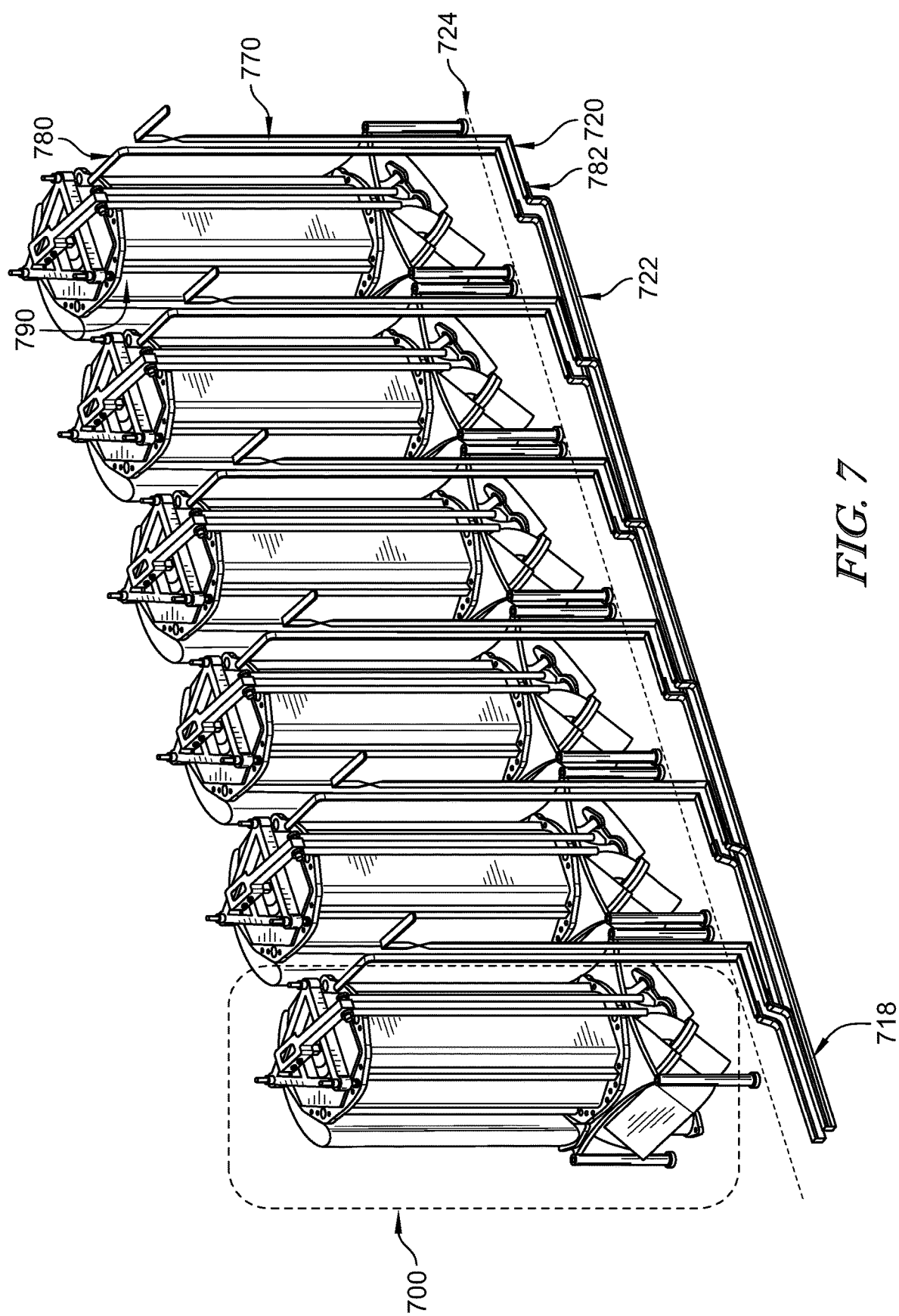
FIG. 7 is an illustration showing one embodiment of fuel cell assemblies and their associated bus bars.

As shown in FIGS. 3 and 7, one or more fuel cell assembly 700 is placed on the mounting stands 164 of the foundational frame assembly 100. More specifically, the fuel cell stack support base 798 of the fuel cell assembly 700 may engage with the mounting stands 164 to secure the fuel cell 700 to the foundational frame assembly 100 (e.g., the fuel cell stack support base 798 of the fuel cell assembly 700 may be coupled to the mounting stands 164 to secure the fuel cell 700 to the foundational frame assembly 100).

The fuel cell utility product assembly 1000 of the present disclosure may comprise any number of fuel cell assemblies necessary to meet the power demand of a user or an operator. In one embodiment, the fuel cell utility product assembly 1000 includes about 1 to about 24 fuel cell assemblies 700 connected to the foundational frame assembly 100, including any number of fuel cell assemblies 700 comprised therein. The fuel cell utility product assembly 1000 may comprise about 12 fuel cell assemblies 700. Each fuel cell assembly 700 may be secured to the foundational frame assembly 100 using fasteners such as bolts.

Referring to FIG. 3, the fuel cell assembly 700 includes one or more of a fuel cell stack support base 798, a heat exchanger assembly 792, a reformer 796, and a fuel cell stack 790. The fuel cell stack 790 may comprise a plurality of fuel cells. Each fuel cell assembly 700 may include access to air and fuel through inlets and outlets (not shown) at its support base 798.

Support structures of the fuel cell stack 790, such as the fuel cell stack support base 798, may need to withstand shock or vibration loads, including but not limited to environmental (e.g., seismic) and/or transportation loads. The fuel cell stack support base 798 may comprise at least four support legs 788. Multiple support legs 788 (e.g., about 2 to about 4 legs) provides additional support to the fuel cell stack support base 798 positioned atop the mounting stands 164 in order to more effectively withstand damaging shock and vibration loads that could negatively affect the life and functionality of the fuel cell stack 790.

The fuel cell stack support base 798 may be comprised of a single component cast of metal (e.g. iron, steel) (not shown). A single component cast comprising the fuel cell stack support base 798 may be designed to be stronger than if the fuel cell stack support base 798 was comprised of multiple parts (e.g., weldment). The fuel cell stack support base 798 may comprise an internal ledge 778 to securely position the heat exchanger assembly 792 upon the fuel cell stack support base 798.

The fuel cell assembly 700 may comprise one or more thermal isolation devices to isolate and separate the thermal conductivity between the fuel cell stack assemblies 700 that operate at high temperatures (e.g., 800-850° C.) from the foundational frame assembly 100 and prevent heat from the fuel cell assembly 700 to be transferred to the foundational frame assembly 100, which can be detrimental to the strength and integrity of the frame 100. In some embodiments, the one or more thermal isolation devices may include one or more thermally-insulative washers 794. In other exemplary embodiments, the washers 794 may be made of materials that are not or are minimally thermally conducive, such as ceramic.

The thermally-insulative washer 794 (e.g., ceramic washer) may be located between the support leg 788 or the support base 798 of the fuel cell assembly 700 and the foundational frame assembly 100. In addition, the thermal isolation provided by these thermally-insulative washers 794 may allow the foundational frame assembly 100 to be constructed out of more cost-effective materials, such as widely available structural steel versus more costly heat resistant metals. These thermally-insulative washers help prevent heat egress and escape from the hot box assembly 800 to the foundational frame assembly 100, which could damage the frame 100 (e.g., enable bending of the frame) such that its unable to support the fuel cell product utility assembly 1000. Importantly, the frame 100 must maintain its physical structure without compromise (bending, cracking, etc.) in order to prevent damage from occurring to a hot box area 824, a hot box 802, and the fuel cell assemblies 800 located therein.

Figure 4:
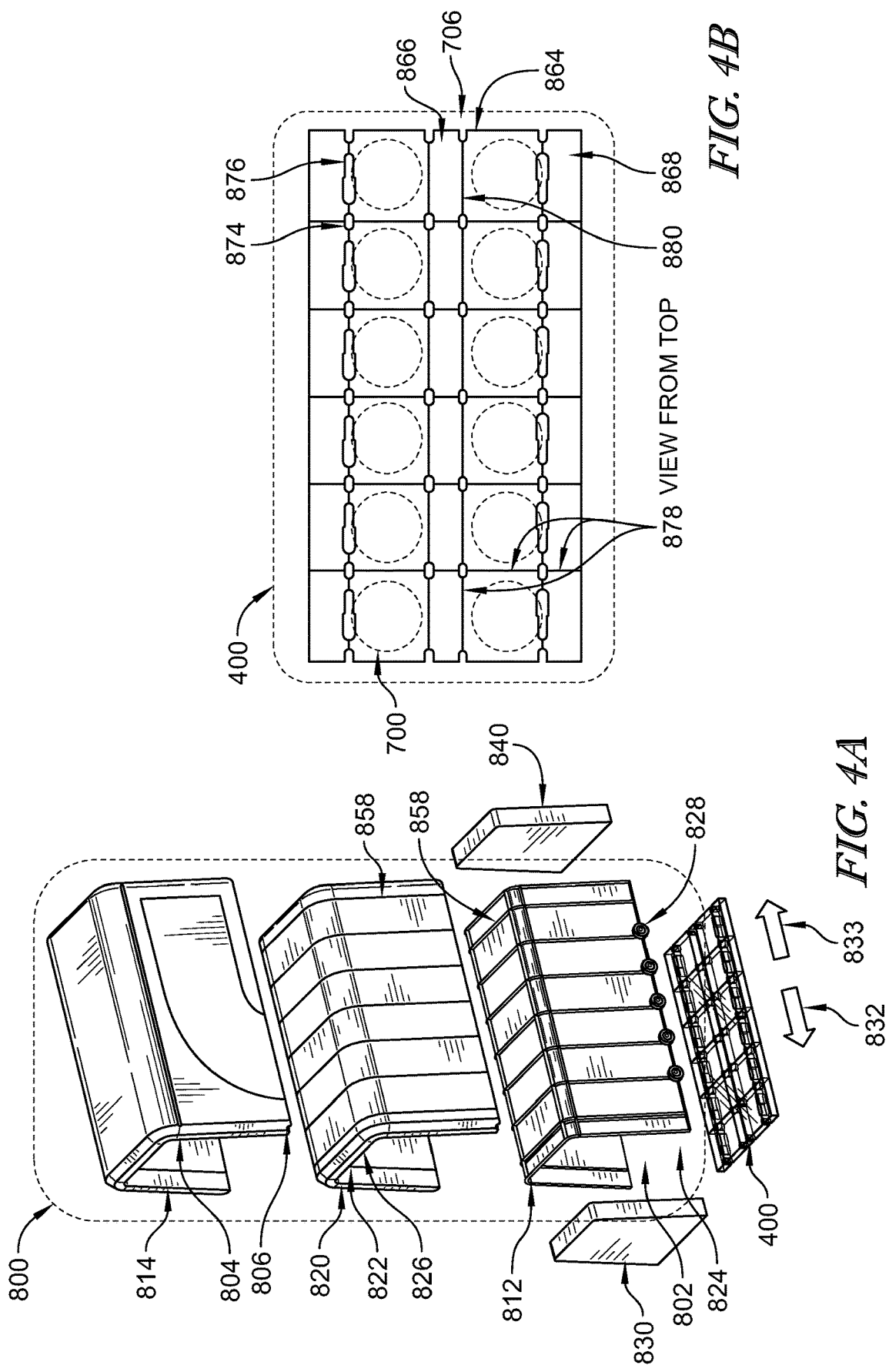
FIG. 4A is an illustration showing different components of one embodiment of an insulation cover.
FIG. 4B is an illustration showing the top-view of one embodiment of a floor insulation layer.
Figure 5:
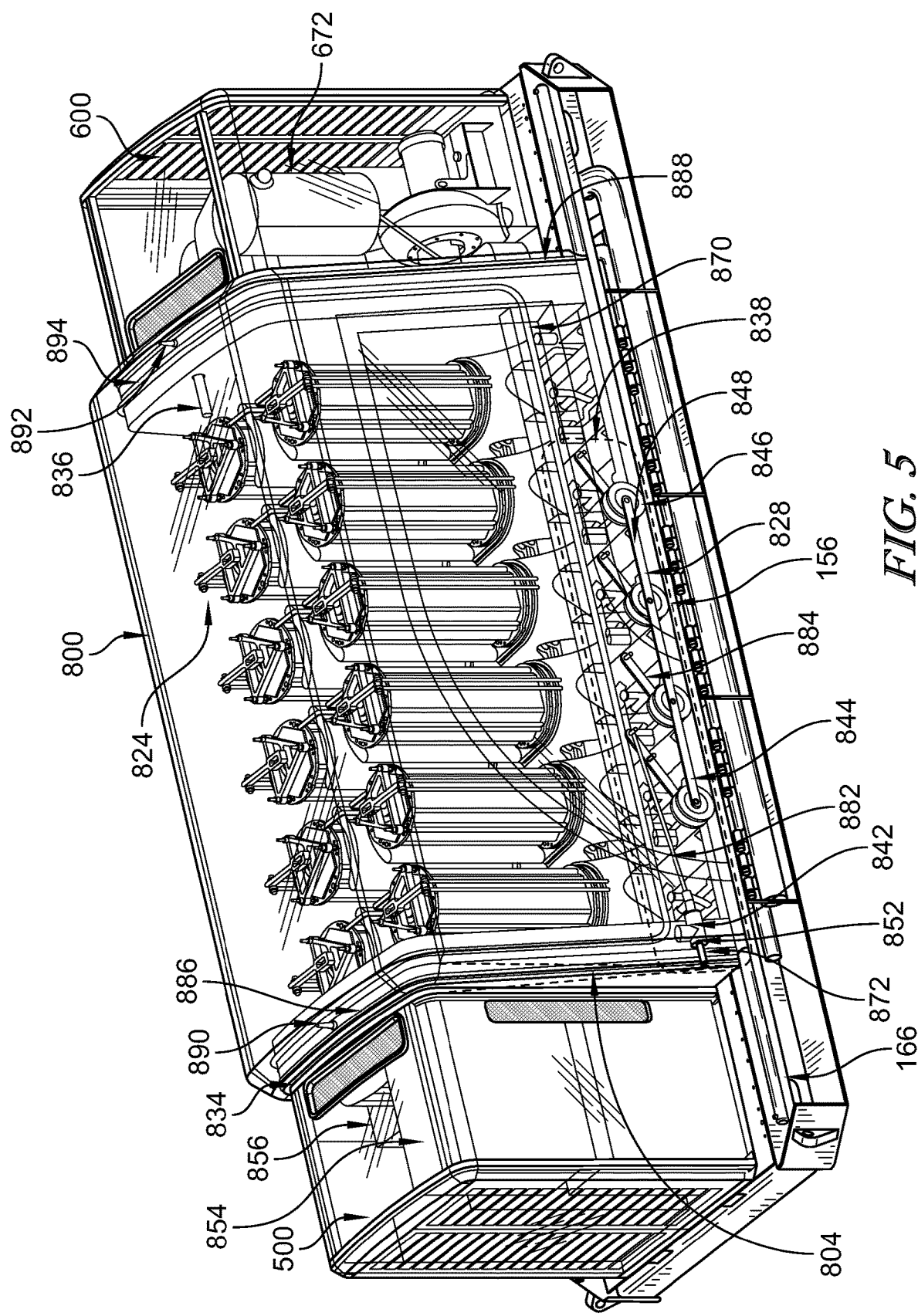
FIG. 5 is an illustration showing different components assembled to form one embodiment of a fuel cell utility product assembly.

One embodiment of a hot box assembly 1000, such as shown in FIGS. 4A and 5, includes the hot box insulation cover 800 (or a portion thereof) that is configured to removably couple to the system, such that the frame assembly 100 defines a hot box area 824 therebetween. The hot box area 824 further defines or includes a hot box 802, both of which are configured to receive other components, such as the fuel cell assemblies 700. Sealing of the hot box area 824 to prevent egress or escape of heat from the hot box area 824 and the hot box 802, as well as ingress of environmental elements (e.g., water, moisture, dust, debris, etc.) into the hot box area 824 and the hot box 802 is a key feature of the present hot box assembly 1000 effectuated by one or more types of seals (e.g., a weather seal and/or a temperature seal).

The hot box insulation cover 800 may comprise one or more of an inner hot box structure 812, a cover insulation 820, and an outer hot box shell 814. Preferred embodiments of the hot box insulation cover 800 comprise all three components 812, 820, and 814. The hot box insulation cover 800 is configured to enclose a hot box 802. The hot box 802 includes the internal spatial region of the inner hot box structure 812 that directly covers and receives the fuel cell assemblies 700 previously described as the hot box area 824.

The inner hot box structure 812, the cover insulation 820, and the outer hot box shell 814 may each be made of a single piece and/or material. In other embodiments, the inner hot box structure 812, the cover insulation 820, and the outer hot box shell 814 may each include multiple pieces, parts, and/or materials (e.g., panels) configured to be connected, attached, or assembled together to form the outer hot box shell 814. For example, the inner hot box structure 812, the cover insulation 820, and the outer hot box shell 814 may each comprise multiple pieces or panels of a material that are attached, connected, bolted, welded, or latched together to form the hot box insulation cover 800 for the fuel cell assemblies 700.

The inner hot box structure or layer 812 provides support to the other layers 820 and 814 of the hot box insulation cover 800. The inner hot box layer 812 may be constructed of any material known to provide structural support, such as a metal (e.g., steel). In an exemplary embodiment, the material of the inner hot box structure 812 is stainless steel. Stainless steel is advantageous as the material of the inner hot box structure 812 since it may be directly and functionally subjected to the high temperatures of about 700° C. to about 1000° C. due to the fuel cell assemblies 700 during operation. The inner hot box structure 812 may be optionally removed, particularly when the cover insulation 820 and the outer hot box shell 820 together provide enough structure to support any insulating materials. However, the functionality of each layer of the hot box insulation cover 800 whether present as a distinct layer or not is imperative.

The inner hot box structure 812 may be externally surrounded by the cover insulation 820 that insulates the hot box 802 and hot box area 824 to prevent heat loss from those critical regions. The cover insulation 820 is primarily used to reduce heat loss from the hot box 802 to the atmosphere by comprising an insulating material 822 to retain and/or absorb heat. The cover insulation 820 may be made of a powder or fibrous insulating material 822 comprising silica. Insulating layers of the cover insulation 820 may comprise any percentage or proportion of multiple or combinations of different insulating materials 822 to achieve the desired heat insulation performance, packaging, and cost target for optimal and efficient performance of the fuel cell assemblies 700.

For example, the cover insulation 820 may comprise a single layer or multiple layers 826 of the insulating material 822. The presence of multiple layers 826 in the cover insulation 820 enable heat retention within the hot box area 824, and allows for a user to safely handle the hot box insulation cover 800 externally. In one embodiment, the cover insulation 820 will comprise multiple distinct insulating layers 826, such as one, two, three, or more distinct layers. The multiple insulating layers 826 of the cover insulation 820 may also be configured into one insulating layer 826, such as by mechanical (e.g., compression) or chemical (e.g. dehydration) processes or mechanisms.

Alternatively, multiple layers 826 of the cover insulation 820 material 822 may comprise at least two, about two, two or more, about three, about four, about five, about six, and six or more insulating layers 826. The insulating layers 826 may comprise varying thicknesses ranging from about 0.01 m to about 0.30 m, including any thickness comprised therein. The sum of the thicknesses of each insulating layer 826 comprising insulating material 822 defines the thickness of the cover insulation 820 provided to the present hot box insulation cover 800.

The cover insulation 820 may be encapsulated by an outer hot box shell 814. The outer hot box shell 814 protects the hot box 802 and hot box area 824, including the fuel cell assemblies 700, from the atmospheric and/or external environment (e.g., weather, dust, moisture, and other elements or conditions). The outer hot box shell 814 may be weathertight, such that it is sealed, airtight, waterproof, physically stable, etc. For example, the hot box insulation cover 800 and/or outer hot box shell 814 can be hermetically sealed. In one embodiment, a weather seal is provided to connect or attach the hot box shell 814 and/or the foundational frame assembly 100 to provide a gap-free seal and weathertight protection to the fuel cell assemblies 700 comprised within the hot box area 824 and the hot box 802.

The outer hot box shell 814 may be constructed of fiberglass or any other structurally protective material, such as aluminum, steel, or stainless steel. In some embodiments, the outer hot box shell 814 may provide protection to the more fragile and sensitive cover insulation 820, which should not get wet. The outer hot box shell 814 may be styled produced according to the overall design aesthetic of the fuel cell utility product assembly 1000. For example, the outer hot box shell 814 may comprise markings, logos, and/or instructions.

Both ends of the hot box 802 and the hot box insulation cover 800 may be capped off and/or sealed by one or more divider insulation walls 830 and 840. The divider insulation walls 830 and 840 help to separate the power electronics enclosure assembly 500 and the mechanical enclosure assembly 600 from the hot box 802. The divider insulation walls 830 and 840 also insulate and protect each of the power electronics enclosure assembly 500 and the mechanical enclosure assembly 600 compartments.

The divider insulation walls 830 and 840 may be constructed of either a single layer or multiple layers of insulation. The insulating material 822 used for the divider insulation walls 830 and 840 is the same or similar to the insulating material 822 used for the cover insulation 820. The divider insulation walls 830 and 840 may also be constructed of a different type of insulation material 822 compared to the cover insulation 820.

The hot box insulation cover 800 may be configured to comprise wheel assemblies 828 that are attached or connected to the cover 800. In some embodiments the hot box insulation cover 800 includes multiple pieces, parts, and/or portions (e.g., one or more panels 858) configured to be connected or attached together by standard mechanisms to form the single cover 800. Each panel 858 of the cover may comprise the inner hot box structure 812, the cover insulation 820, and the outer hot box shell 814. Each panel 858 of the hot box insulation cover may also configured to include one or more wheel assemblies 828 to enable the lifting and movement of each panel 858 of the cover 800 along the wheel tracks 166 and 174.

For example, in an embodiment where the hot box insulation cover 800 is made of two panels (e.g., Panel A and Panel B), Panel A will have one or more wheel assemblies 828 to enable the lifting and movement of that portion of the cover 800 along the wheel tracks 166 and 174. Similarly, Panel B will have one or more wheel assemblies 828, that are separate and distinct from the wheel assemblies 828 dedicated to Panel A, in order to enable the lifting and movement of that Panel B portion of the cover 800 along the wheel tracks 166 and 174. The wheel assemblies 828 of the multiple cover panels 858 may be configured to lift vertically off of and away from the hot box area 824 and move each panel 858 horizontally along the wheel tracks 166 and 174 in the same or opposite directions in order to access the fuel cell assemblies 700 or other hot box assembly 1000 components.

In one embodiment, one or more hot box wheel assemblies 828 may be mounted to the inner hot box structure 812. The one or more hot box wheel assemblies 828 may allow the hot box insulation cover 800 comprising the inner hot box structure 812, the cover insulation 820, and the outer hot box shell 814 to move. Mobility is a key feature of the hot box insulation cover 800 that allows ease of access to inner fuel cell assembly 700 components, such as during repair and/or maintenance, without complete, partial, or any disassembly of the hot box assembly 1000.

Specifically, the wheel assemblies 828 comprise wheels 846 that engage each other such that the wheels 846 roll upon the wheel tracks 166 and 174. The wheel assemblies 828 aid in rolling the hot box insulation cover 800 along the wheel tracks 166 of the frame rail 120 and 130. However, before doing so, the wheel assemblies 828 are configured to first mechanically or manually move the cover 800 up, off, and away from the hot box 802 so as to break, disengage, or disassociate any seal (e.g., weather and/or temperature seal) connecting the hot box insulation cover 800 to the frame assembly 100. More specifically, the wheels 846 located and attached to the base of the cover 800 of the fuel cell utility product assembly 1000 may be moved (e.g., translated) and/or translocated fore and aft along the wheel tracks 166, as depicted by arrows 832 and 833 of FIG. 4A, such as is necessary to access the hot box 802 or hot box area 824 during assembly, servicing, transportation, and/or testing of the fuel cell assemblies 700 comprised therein.

The wheel assemblies 828 and wheel tracks 166 and 174 of the frame rail 120 and 130 also define the outer boundary of the hot box floor 400. The hot box floor 400, when connected, attached, and/or sealed to the divider insulation walls 830, 840 and the cover insulation 820, form the internal hot box 802 or the hot box area 824. In the embodiment shown in FIG. 4B, the hot box floor 400 includes an insulation material 822. The insulation material of the hot box floor 400 may be the same, similar, or different from the insulating material 822 used for the divider insulation walls 830, 840 and/or the cover insulation 820.

The hot box floor insulation 400 may form a final barrier and retention mechanism for any heat lost from the base of the fuel cell utility product assembly 1000. The hot box floor insulation 400 may comprise one or more tiles 866, 868, 864. The hot box floor insulation tiles may comprise one or more fuel cell lower insulation tiles 864. The hot box floor insulation tiles may comprise one or more bus bar insulation tiles 866. The hot box floor insulation tiles may comprise one or more outer insulation tile 868. The hot box floor insulation 400 may comprise any number of tiles, such as a total number of tiles ranging from about 2 to about 80 number of tiles, including any number of tiles comprised therein.

The hot box floor insulation 400 may comprise a single insulation tile. In a preferred embodiment, the hot box floor insulation 400 may comprise multiple segmented tiles 866, 868, 864. Segmented tiles, as shown in FIG. 4B, are typically not produced in a single piece. Instead segmented tiles 866, 868, 864 may be configured to engage with one another by adhesion, attachment, connection using any means in order to form a single hot box floor insulation 400 unit.

Segmented tiles 866, 868, 864 are preferable because they allow for easy production assembly and/or operational service access to piping and/or plumbing located between the foundational frame assembly 100 and the hot box 802 comprising fuel cell assemblies 700. A particular advantage of the use of segmented tiles 866, 868, 864 in the present the fuel cell utility product assembly 1000 allows for removal of one or more specific tiles 866, 868, 864 in specific regions of the hot box floor insulation 400 in order to access, service, and/or repair specific components, plumbing, and/or features of the hot box 802 or fuel cell assemblies 700 without removing or disassembling the whole, entire, or a significant portion of the hot box floor insulation 400.

Specifically, the segmented tile approach comprised by the present fuel cell utility product or hot box assembly 1000 may allow for local replacement and servicing of the hot box 802 and fuel cell assemblies 700 that would not be permissible with a larger single or one-piece structure. Local replacement and servicing may allow the access and servicing of a single fuel cell assembly 700 without moving, touching, and/or accessing other fuel cell assemblies 700 in the hot box 802, which is an advantageous feature of the present disclosure.

Referring to FIGS. 1, 4A, and 4B, an outer insulation tile 868 is used to route and/or access the primary plumbing 200 and/or the intermediate plumbing 300 below the fuel cell assembly 700. In some embodiments, a fuel cell lower insulation tile 864 may be located directly under the fuel cell assembly 700, such that the fuel cell lower insulation tile 864 may be removed by a user, an operator, or a technician to allow access to any plumbing directly under the fuel cell assembly 700 and its components (e.g., for service or repair).

In one embodiment, as shown in FIGS. 4B and 7, a plurality of bus bar insulation tiles 866 are located over a center channel 706. The center channel 706 is generally positioned down the middle of the hot box floor insulation 400, similar to the bus bar insulation tiles 866. The center channel 706 and the bus bar insulation tiles 866 are located between fuel cell assemblies 700, which are typically located on the left and right sides of the hot box floor insulation 400 (see FIG. 4B). The center channel 706 will route the bus bars 770 to the power electronics enclosure assembly 500.

Various pass through provisions 874 and 876 may be incorporated into the hot box floor insulation 400 in order to mount fuel cell assemblies 700 and to enable and allow plumbing and/or piping connections to enter and exit the hot box 802 (see FIG. 4B). In some embodiments, unwanted gaps between the segmented tiles 866, 868, 864 may be reduced and/or mitigated with "stepped" interfaces or flexible insulation 880 utilized around and between the tile joints 878, which can help to seal and prevent heat loss from the hot box 802 through the floor 400. The flexible insulation 880 can be the same, substantially the same, or similar to or different from the material of the high temperature flexible seals 870 utilized on the hot box insulation cover 800 for the same purposes.

FIG. 5 illustrates further details regarding the fuel cell utility product assembly 1000, including the integration of the hot box insulation cover 800, the foundational frame assembly 100, a network of primary plumbing 200, a network of intermediate plumbing 300, the power electronics enclosure assembly 500, the mechanical enclosure assembly 600, and the one or more fuel cell assemblies 700. As shown, in addition to the foundational frame assembly 100 and the divider insulation walls 830 and 840, the primary support for the hot box insulation cover 800 during operational use is provided by two support hoops 886 and 894.

Each support hoop 886 and 894 is positioned outside of or exterior to one associated divider insulation wall 830, 840 and may be made of any material that reinforces, supports, and/or holds stable the hot box insulation cover 800, particularly during operation. For example, the two support hoops 886 and 894 may comprise or be made of one or more metals (e.g. steel). In one embodiment, the hot box insulation cover 800 is configured to close and/or seal the hot box 802 by contacting and securely fitting over the divider insulation walls 830 and 840 and the two support hoops 886 and 894 (see FIG. 5).

The hot box insulation cover 800 may include one or more weather seals 834 and 888, which may be positioned at either end of the hot box insulation cover 800 near the power electronics enclosure assembly 500 and the mechanical enclosure assembly 600. Typically, the weather seal 888 may also be positioned outside of or exterior of the hot box 802 and/or the hot box area 824. As shown in FIG. 5, the weather seal 834 may be positioned outside of or exterior to (e.g., relative to the fuel cell assemblies) the support hoop 886. The weather seal 888 may also be positioned outside of or exterior to the support hoop 894.

In another embodiment, the one or more weather seals 834 and 888 may be positioned at any point along the outer edge or periphery of the hot box insulation cover 800. In one such embodiment, the one or more weather seals 834 and 888 may be positioned completely along the periphery of the hot box insulation cover 800, such as where the cover 800 meets or contacts the foundational frame assembly 100, the power electronics enclosure assembly 500, and/or the mechanical enclosure assembly 600. The weather seals 834 and 888 help enable the hot box insulation cover 800 to removably, repeatedly, and organically (e.g., without external manipulation) come to a resting point atop the foundational frame assembly 100 in order to seal and protect the fuel cell assemblies 700 comprised therein.

Referring to FIG. 5, the one or more weather seals 834 and 888 may be comprised of any material that seals, waterproofs, and/or protects the fuel cell assemblies 700 inside of the hot box 802. For example, the one or more weather seals 834 and 888 may prevent ingress of water, dust, moisture, rain, wind, snow, insects and/or other elements that may cause damage, degradation, and/or deterioration of the fuel cell assemblies 700 from migrating into the hot box 802. The one or more weather seals 834 and 888 may comprise a flexible "rubber" like material.

In one embodiment, the hot box insulation cover 800 may additionally or alternatively comprise one or more high temperature flexible seals 870, also called a hot seal (see FIG. 5). The hot seal or high temperature flexible seal 870 may be constructed of a material that is able to withstand the high operational temperatures (e.g., 700° C. to 950° C.) of the fuel cell assemblies 700 within the hot box 802. The high temperature flexible seal 870 enables flexibility and mobility of the cover 800 during operations while sealing the interfaces of the hot box insulation cover 800 with all other elements or components (e.g., the frame 100, the power electronics enclosure assembly 500, and/or the mechanical enclosure assembly 600).

The hot seal or high temperature flexible seal 870 helps enable the hot box insulation cover 800 to removably, repeatedly, and organically (e.g., without external manipulation) come to a resting point atop the foundational frame assembly 100 in order to provide a gap-free seal and insulated protection of the fuel cell assemblies 700 comprised therein from heat loss. The material of the high temperature flexible seal 870 may be a woven material and/or a fibrous material. For example, the material of the high temperature flexible seal 870 may be wool, ceramic, fiber, etc.

The flexibility provided by the high temperature flexible seal 870 may also account for any manufacturing part-to-part variation that may otherwise create an undesirable gap between panels of the hot box insulation cover 800, the power electronics enclosure assembly 500, the mechanical enclosure assembly 600, the hot box floor insulation 400, and/or the foundational frame assembly 100. The divider insulation walls 830 and 840, the hot box floor insulation 400, and/or the high temperature flexible seal 870 may each independently and/or collectively contribute to the improvement and/or maintenance of the thermal integrity of the hot box 802 and prevent or reduce thermal losses. This is important since any heat loss from the hot box 802 directly results in fuel cell assembly 700 efficiency losses or inefficiencies in the fuel cell utility product assembly 1000.

Weather seals 834 and 888 or high temperature flexible seals 870 may be independently utilized in the fuel cell utility product assembly 1000. In a preferred embodiment, both the one or more weather seals 834 and 888 and hot seals 870 are comprised in the hot box insulation cover 800 of the fuel cell utility product assembly 1000. Such embodiments may be formed in one or more layers and/or comprising one or more materials to satisfy functions of both the weather seals and the hot seal. Typically, the weather seals 834 and 888 are located on the exterior of the hot box 802 or hot box area 824, while the temperature seals 870 are located on the interiors of the hot box 802 or hot box area 824. When the weather 834 and 888 and temperature seals 870 are combined into one structure, that combined seal may be located internal or external to the hot box 802 and hot box area 824.

The hot box insulation cover 800 of the fuel cell utility product assembly 1000 is designed to have a slant or a draft angle 804 along its periphery. The draft angle 804 of the cover 800 is the angle by which the hot box insulation cover mates or engages with the foundational frame assembly 100 via the seals (e.g., the weather and/or hot seals). The draft angle 804 further defines the angle of the incline of a cover interface surface 806, the inner perimeter surface of the cover 800, as measured from a cover base 808 or the bottom of the cover 800 to the top surface 810 of the cover 800 (see FIG. 4A). The cover interface surface 806 is the portion of the hot box insulation cover 800 that is configured to connect with or attach to other components of the assembly 1000, such as the foundational frame assembly 100, the power electronics enclosure assembly 500, and the mechanical enclosure assembly 600.

The draft angle 804 is less than 180 degrees, such that the hot box insulation cover 800 does not include a straight vertical angle or sides that causes the weather and/or temperature seals to be difficult or unable to be disengaged or disassociated. Preferably, the draft angle 804 will range from about 5 to 45 degrees, comprising any specific or range of sizes of angles provided therein. In one embodiment the draft angle 804 is at or about 10 degrees. Notably, an optimal draft angle 804 will improve the sliding of the cover 800 across the foundational frame assembly 100. Said differently, a positive slope increases the effectiveness of the weather and temperature seals and ensures that the weather and temperature seals of the assembly will "lock" and/or seal the cover 800 into place upon the frame 100.

Importantly, the draft angle 804 is made to sealably mate or engage the cover interface surfaces 806 of the cover 800 with the surfaces of each of the other components of the assembly 1000, such as the foundational frame assembly 100, the power electronics enclosure assembly 500, and the mechanical enclosure assembly 600 via the seals. The draft angle 804 allows the weather and hot seals to ease disengagement of the seals when lifting and/or rolling the cover 800 off and away from the hot box area 824.

The draft angle 804 also helps prevent damage to the seals and increases durability of the cover 800 by minimizing the rubbing of the assembly 1000 components by way of the seals. The draft angle 804 may be designed or tailored specifically to house any number of fuel cell assemblies 700 to meet a power demand For example, the weight of the cover 800 and the height the cover 800 must be considered. Specifically the height of the cover 800 must be lifted to be physically above the weather and/or temperature seals on the cover interface surfaces 806, the wheel tracks 166 and 172, and the foundational frame assembly 100, which must be considered in specifying the draft angle 804. The length the cover 800 will roll in order to make sure it does not cover the exhaust or intake points, such as the outlet manifolds 744 and inlet manifolds 742 of the assembly 1000 must also be considered in specifying the draft angle 804.

As previously mentioned, the hot box insulation cover 800 may include an integral mechanical lifting mechanism 838, which may comprise one or more hot box wheel assemblies 828. The one or more hot box wheel assemblies 828 enable the hot box insulation cover 800 to be lifted vertically after disengaging or disassociating a weather seal 888, 834 and/or temperature seal 870 and removed from the hot box 802. The one or more hot box wheel assemblies 828 also enable the hot box insulation cover 800 to be moved horizontally on and along the wheel tracks 166 and 174.

Each hot box wheel assembly 828 may include one or more wheels 846 and a sliding bar system 848. The wheels 846 mount to the sliding bar system 848 by any known mechanism (e.g., bolts, screws, etc.). For example, an exemplary sliding bar system 848 is a four (4)-bar mechanism that allows the hot box cover 800 to be lifted and removed from the hot box 802 and hot box area 824 by moving the centerline of the wheels 846. The sliding bar system 848 includes one or more horizontal linkage bars 844 and/or one or more angled linkage bars 884.

The horizontal linkage bars 844 are utilized to interconnect all wheels 846 of the wheel assembly 828 so they act (e.g., roll) in unison. The angled linkage bars 884 are utilized to lift and remove the hot box insulation cover 800 from the hot box 802. Together, the angled linkage bars 884 are first engaged to lift the cover 800 vertically up away from the hot box area 824. Subsequently, the horizontal linkage bars are engaged to roll the wheels 846 of the cover 800 along the wheel tracks 166 to expose the hot box 802 and hot box area 824, including the fuel cell assemblies 700.

Referring again to FIG. 5, in one embodiment, the top ledge 156 of the foundational frame assembly 100 may comprise wheel tracks 166. The wheel tracks 166 are configured to allow movement and/or translocation of the hot box insulation cover 800 in order that the fuel cells assemblies 700 and other components comprised therein may be exposed and accessed, such as during any service event. More specifically, the wheel tracks 166 and 174 are configured to allow the hot box insulation cover 800 to be opened and closed by rolling or sliding the hot box insulation cover 800 along the wheel tracks 166 and 174.

The wheel tracks 166 may be manufactured or produced as a part of the top ledge 156. The wheel tracks 166 may be affixed, attached, and/or connected to the top ledge 156 of the "C"-shaped frame rails 130 and 120 by any mechanism. The wheel assemblies 828 along the wheel tracks 166 are connected to one or more power screws 882 (shown in FIG. 5) to move the hot box insulation cover 800.

A power screw 882 may be actuated by a gear box 842 that is turned via a drive mechanism 852. The drive mechanism 852 may be positioned at an external drive point 872 that can be activated manually, such as by a hand crank. The external drive point 872 may also be activated electro-mechanically, such as by an integral electric motor interface that is activated by an automatic, electronic, or manual command.

Rotation of the power screw 882 may cause the angled linkage bars 884 to rotate the one or more hot box wheel assemblies 828 down to engage the wheel tracks 166 and 174 on the foundational frame assembly 100. In an exemplary embodiment, there is a wheel assembly 838 located along the two "C"-shaped frame rails 130 and 120. Further rotation of the power screw 882 may cause the angled linkage bars 884 to further shift the wheels 846 of the wheel assembly 828 toward the mechanical enclosure assembly 600, such that the hot box insulation cover 800 is unsealed, opened, and/or lifted from the hot box 802.

The hot box insulation cover 800 may further be raised up and along locating pins 890 and 892, such as those positioned atop the two support hoops 886 and 894, as shown in FIG. 5. Continued rotation of the power screw 882 may further raise or levitate the hot box insulation cover 800 off the locating pins 890 and 892 and the hot box area 824 to allow the hot box insulation cover 800 to be freely rolled fore and aft along the wheel tracks 166 and 174, such as is necessary during inspection and service of the fuel cell assemblies 700 within the hot box 802.

The lifting mechanism may be a mechanical linkage, such as described above, or may be enabled by pneumatic or hydraulic cylinders directly or indirectly attached to the hot box wheel assembly 828. The lifting mechanism may also be enabled by electrical mechanisms, such as solenoids or motors. In other embodiments, additional connections may be established between both sides of the lifting mechanism positioned along the two "C"-shaped frame rails 130 and 120 in order to achieve synchronized motion of the wheel assemblies 828.

Referring back to FIG. 5, in one embodiment, a power electronics enclosure assembly 500 may be located at one end of the hot box insulation cover 800 on the foundational frame assembly 100. The power electronics enclosure assembly 500 may house an electronic signal conditioning hardware 854 and/or a main electronic control system 856 for the fuel cell utility product assembly 1000. The control system 856 of the present fuel cell utility product assembly 1000 may comprise one or more controllers, processors, memories, etc. to send and/or receive command(s), operations, and functional signals from the multiple different components, actuators and sensors of the fuel cell utility product assembly 1000.

A mechanical enclosure assembly 600 may be located at the other end of the hot box insulation cover 800 on the foundational frame assembly 100 opposite the power electronics enclosure assembly 500. The location or end that the power electronics enclosure assembly 500 and the mechanical enclosure assembly 600 are located on or at are interchangeable. The mechanical enclosure assembly 600 may house any mechanical hardware that supplies the input mass flow of fuel (e.g., natural gas, $H_2$, etc.) or oxidant (e.g., air or $O_2$) to the more than one fuel cell assemblies 700. In addition, the mechanical enclosure assembly 600 may comprise thermal and cooling system components (radiators, heaters, coolants, etc.) that are separated from the fuel cell assemblies 700 of the hot box 802 and hot box area 824.

The dedicated power electronics enclosure assembly 500 and dedicated mechanical enclosure assembly 600 of the present the fuel cell utility product assembly 1000 advantageously enable a completely separate production line or the opportunity to engage a different supplier to manufacture these components for eventual assembly into the larger fuel cell utility product assembly 1000. It may also be advantageous that the electronics enclosure assembly 500 and/or the mechanical enclosure assembly 600 are separate from each other and the rest of the fuel cell utility product assembly 1000 as it may enable an efficient and clean production environment for each component. Separation of the power electronics enclosure assembly 500 and mechanical enclosure assembly 600 (e.g., each being a "dedicated" system) enables a modular approach to the fuel cell utility product assembly 1000, such that the eight major components of the assembly (100-900) may be separately manufactured and assembled.

Figure 6:
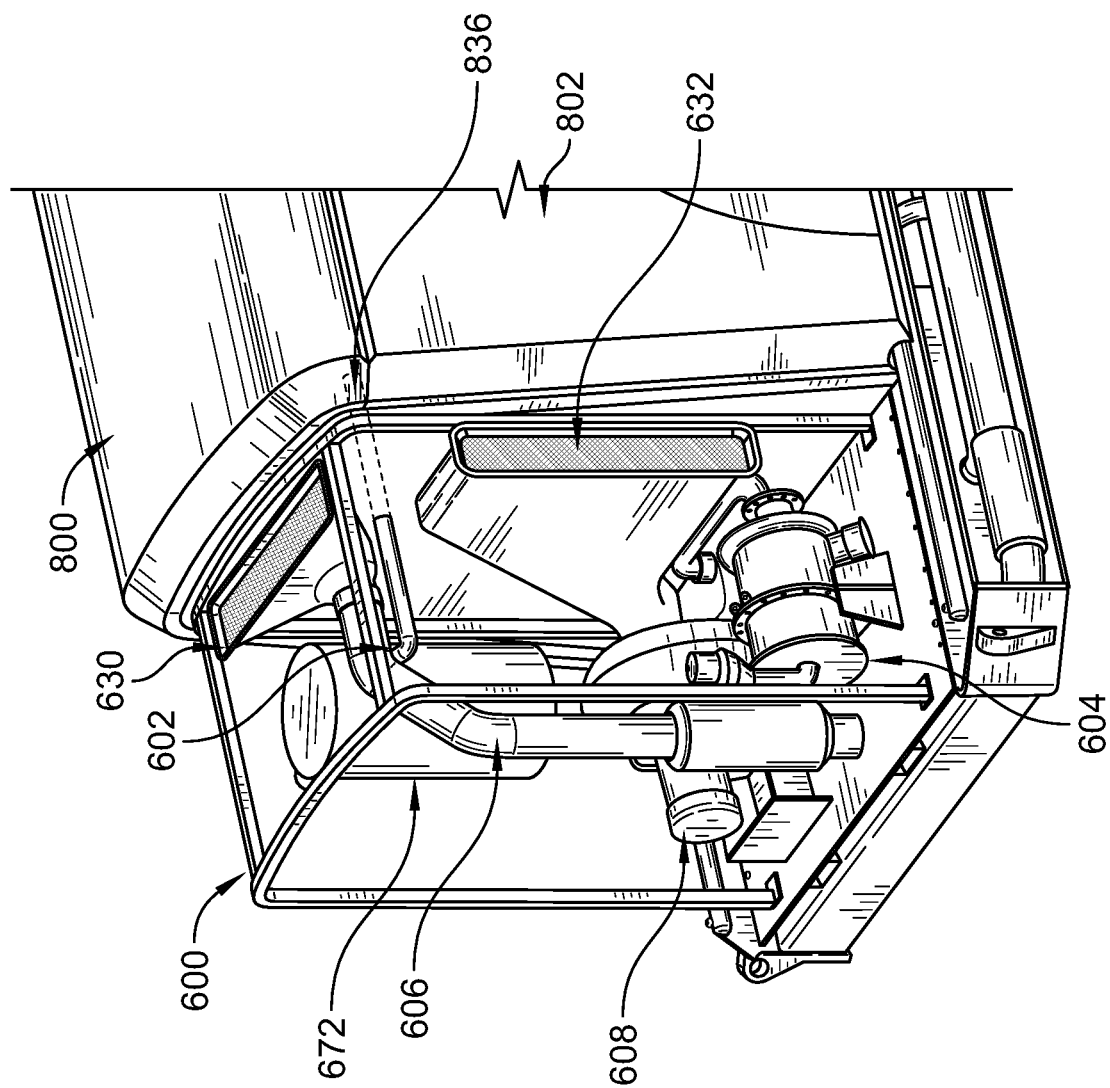
FIG. 6 is an illustration showing different components of one embodiment of a mechanical enclosure assembly.

FIG. 6 illustrates an embodiment of the mechanical enclosure assembly 600 that houses an air blower 608 and a fuel blower 604. The air blower 608 may be supplied filtered fresh air through the system air inlet duct or vent 632. After air is transported through the system, particularly the fuel cell assemblies 700, the air may migrate into the main air outlet pipe 606 and then out of the system air outlet duct or exhaust vent 630 to the atmosphere. In other embodiments, parasitic devices, such as blowers and pumps are not utilized in the fuel cell utility product assembly 1000.

The mechanical enclosure assembly 600 may optionally include a secondary scavenge tube 836, which may extend into the area covered by the hot box insulation cover 800 (e.g., the hot box 802) such as to retrieve and exhaust any excess air or fuel that has leaked into the hot box 802. To exhaust excess air, the secondary scavenge tube 836 may be connected to the main air outlet pipe 606 at junction 602. The secondary scavenge tube 836 uses the exhaust flow as a venturi to purge the hot box volume, which aids to prevent excess gas buildup. A blower, pump, or other parasitic devices may not be used to exhaust the excess hot air in some embodiments.

The geometry of junction 602 may be designed to passively pull air from the hot box 802 area covered by the hot box insulation cover 800 via the natural flow of air out of the system air outlet duct or vent 630. In other embodiments, this passive exhaust flow of excess air may also provide an outlet to exhaust any gaseous leaks that could develop in the hot box 802 area. Therefore, the air exhaust mechanisms of the mechanical enclosure assembly 600 provide a mechanism to exhaust both air, gases, and fuel.

The mechanical enclosure assembly 600 may comprise an emergency stop tank 672. In some embodiments, the emergency stop tank 672 may comprise a urea catalyst. The emergency stop tank 672 may also allow for an emergency shut down of the fuel cell utility product assembly 1000 by releasing the urea catalyst. The fuel blower 604 may circulate fuel throughout the system to be combined with air from the air blower 608 within the fuel cell assemblies 700. In a solid oxide fuel cell, the fuel may be natural gas that is reformed in the reformer 796 to produce the hydrogen needed in a fuel cell chemical reaction.

Figure 12:
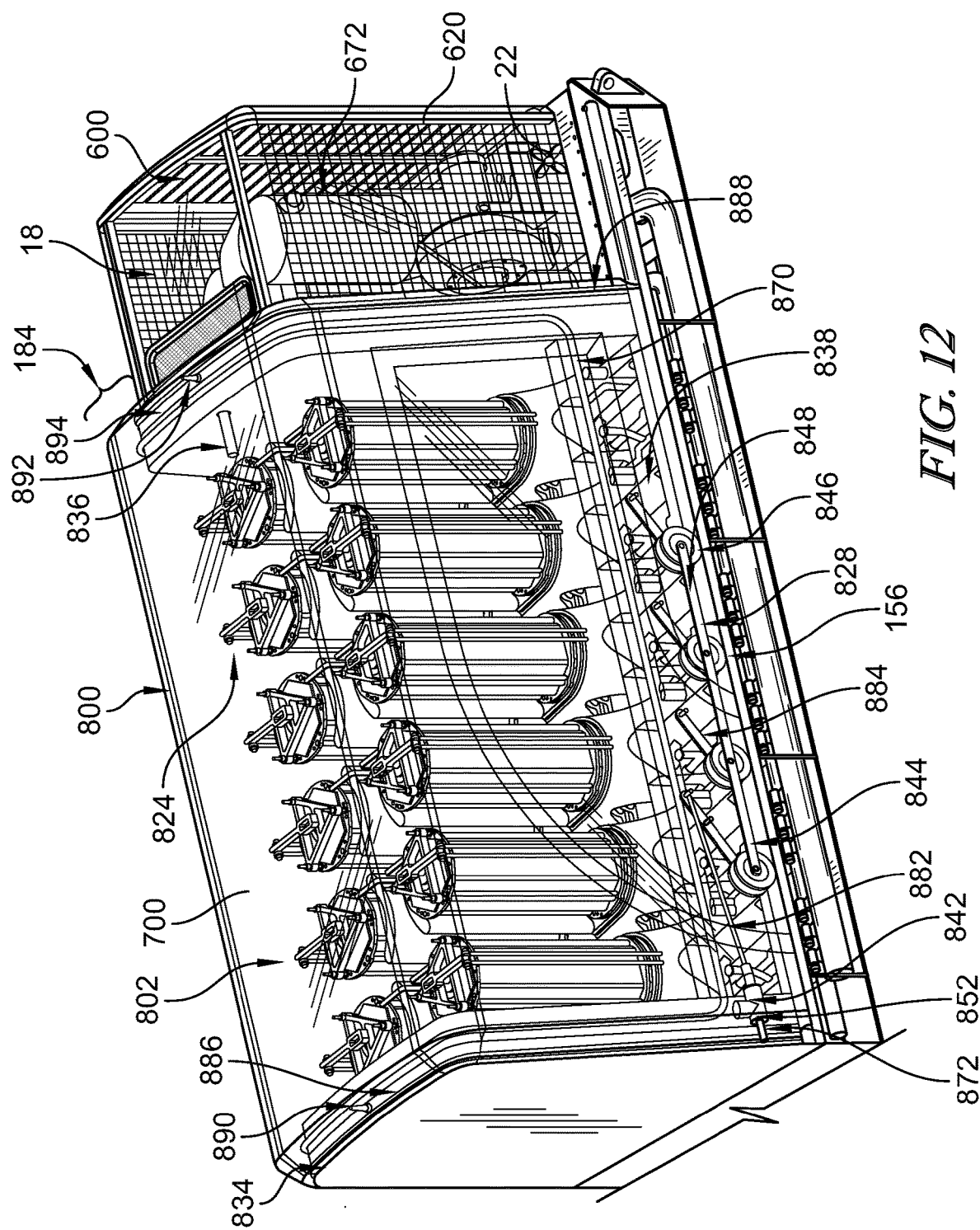
FIG. 12 is an illustration of an embodiment of the fuel cell assembly with a cooling system or a thermal management system of the mechanical enclosure assembly that is distinctly separated from the fuel cell stack, system, and assembly components.

Additionally, FIG. 12 is an illustration of another embodiment of a fuel cell utility product assembly 800 comprising the mechanical enclosure assembly 600 that is distinctly separated from the fuel cell stack, system, and assembly components 700. In this embodiment, the mechanical enclosure assembly 600 houses a cooling system and/or a thermal management system 620. In this embodiment of FIG. 12, the power electronics enclosure assembly 500 is optionally absent.

Preferably, the power electronics enclosure assembly 500 is positioned on the opposite end of the hot box area 824 and the hot box 802 as the mechanical enclosure assembly 600, as previously shown in FIGS. 1, 5, and 6. In other embodiments, the power electronics enclosure assembly 500 separated from the fuel cell stack, system, and assembly components 700 could be optionally positioned on the opposite end of the hot box area 824 and the hot box 802, with the mechanical enclosure assembly 600 absent.

For example, FIG. 12 demonstrates a side-by-side positioning layout of the thermal management system 620 comprising one or more radiators 18 that are located on the same surface and/or in the same plane, but different compartments than the fuel cell system 700. Similarly, the radiators 18 may include or be configured to be connectably linked or attached to one or more fans 22. The fans 22 may be located on the same surface and/or in the same plane, on in a plane, surface, or area that is above or below the radiators 18, the latter of which is shown in FIG. 12. The thermal management system 620 comprising the radiator 18 and fans 22 is located on or atop the same foundational frame assembly 100 as the fuel cell assemblies 700 that are also located on or atop the same foundational frame assembly 100.

The radiator 18 of the thermal management system 620 and the fuel cell assemblies 100 may also be positioned or located on the same plane and in any position or location that provides operational efficiency, assessment, maintenance, and/or repair of the fuel cells by lifting, rolling, and/or removing the hot box insulation cover 800 for the hot box area 824 comprising the hot box 802. Notably, the fuel cell utility product assembly 1000 of the present disclosure demonstrates an advantageous side-by-side system layout embodiment.

In one such embodiment, the fuel cell stacks or fuel cells of the fuel cell assembly 700 are distinctly and separately located adjacent to main cooling or heating system components of the thermal management system 620 (e.g., fans, blowers, heaters, coolant, etc.). In other embodiments, the thermal management system 620 does not comprise parasitic devices for heating and cooling (e.g., fans, blowers, heaters, etc.). This side-by-side layout design comprising the thermal management system 620 located adjacent to and separately from the fuel cell assemblies 700 provides some benefits over other layout embodiments that are not side-by-side.

Importantly, the side-by-side layout of the present fuel cell utility product assembly 1000 demonstrated in FIGS. 1, 5, 9, 10, and 12, and described herein, allows for the hot box area 824, hot box 802, and the fuel cells assemblies 700 to be more easily accessible for servicing without significant disturbance to the cooling and other sub-systems of the thermal management system 620 in the mechanical enclosure assembly 600, as well as the powers electronic enclosure assembly 500. This side-by-side layout of the fuel cell utility product assembly 1000 also facilitates redesign, resizing, and/or repositioning of one or both of the thermal management (e.g., cooling) system 620 and the fuel cells of the fuel cell assemblies 700, which can be increased or decreased independently of each other, if required. This additional flexibility of the side-by-side positioning of the hot box area 824, hot box 802, and the fuel cells assemblies 700, the thermal management system 620 of the mechanical enclosure assembly 600, as well as the powers electronic enclosure assembly 500 significantly reduces the time and number of components that would need to be redesigned in any new fuel cell system.

Importantly, the side-by-side design of the fuel cell utility product assembly 1000 having the hot box area 824 and the hot box 802, including the fuel cell assemblies 700, next to and/or sandwiched between the mechanical enclosure assembly 600 and/or the powers electronic enclosure assembly 500 lies in that the fuel cell assemblies 700 remain separated from the cooling or thermal management systems 620.

In some embodiments, the fuel cell assemblies 700 and thermal management system 620 of the mechanical enclosure assembly 600 are separated by a distinct, uniform, or non-uniformly shaped separation distance 184 that ranges from about 0.5 inch to about 12 inches in width, including any and all specific or range of distances comprised therein. In some embodiments, the separation distance 184 is uniformly shaped, such as in a straight line, that has a separation distance or thickness 184. The thickness or distance of the separation distance 184 ranges from about 0.5 inch to about 12 inches thick, including all specific or range of thickness 184 comprised therein.

The separation distance 184, located between the fuel cell assembly 700 and the mechanical enclosure assembly 600 that comprises the thermal management system 620, may range from about 0.5 to about 12 inches long, including all specific or range of distances comprised therein. Side-by-side and distinct separation of the fuel cells of the fuel cell assembly 700 from the radiators and other components of the thermal management system 620 enable easy accessibility to the fuel cells or fuel cell assembly 700 components comprised in the hot box area 824 and hot box 802 for servicing. The side-by-side positioning of the fuel cell assembly 700 next to the mechanical enclosure assembly 600 and the thermal management system 620 also minimizes or reduces the amount or need for disassembly of other components and disturbing significant parts of other sub-systems in order to reach the fuel cells of the fuel cell assemblies 700.

For example, the present side-by-side layout of the fuel cell assemblies 700, the mechanical enclosure assembly 600, and the power electronics enclosure assembly 500 of the fuel cell utility product assembly 1000 is an improvement over the fuel cell layouts known or currently in the art. Illustratively, the side-by-side layout of the fuel cell assembly 700 and the mechanical enclosure assembly 600 including the thermal management system 620 is advantageous over alternative layouts, wherein the radiators may be located or positioned over top, atop, or on top of the fuel cell systems or assemblies 700. Such a layout thereby requires that the cooling or thermal management system 620 be moved or removed before the fuel cell assembly 700 components are accessible for assessment, maintenance, and/or repair. Therefore, the present side-by-side layout of the fuel cell assembly 700, the mechanical enclosure assembly 600, and/or the power electronics enclosure assembly 500, as shown in FIGS. 1, 5, 9, 10, and 12, also facilitates the design of other iterations of the present invention as the fuel cell and cooling systems can be increased or decreased in scope and size, independently.

For example, if more cooling or heating is needed because the presently claimed system and methods are going to be deployed in a part of the world having hot, ambient temperature, the side-by-side positioning of the present the fuel cell assembly 700, the mechanical enclosure assembly 600, and/or the power electronics enclosure assembly 500 would easily allow or enable expansion of the cooling or thermal management system 620 on its distinct side to include longer or larger radiators. In turn, expanding or enlarging the radiators or other cooling mechanisms in the mechanical enclosure assembly 600 to allow for the required cooling in hot temperatures could be conducted without affecting the components of the fuel cell assembly 700 on its side. The independent ability to access the fuel cell assembly 700, the mechanical enclosure assembly 600, and/or the power electronics enclosure assembly 500 separately and independently also thereby advantageously minimizes any redesign efforts and increasing cooling and thermal management 620 efficiency.

FIG. 7 illustrates a path for a flow of electrical power generated by the fuel cell assemblies 700 out of the hot box 802. In one embodiment, proximal ends of the high temperature bus bars 770 are connected to the top of the fuel cell assemblies 700 either through welded or bolted connections 780. The high temperature bus bars 770 may be subject to the high internal temperatures of about 700° C. to about 850° C. generated by the fuel cell assemblies 700 in the hot box 802.

The high temperature bus bars 770 may be constructed of any high temperature resistant material. For example, the high temperature bus bars 770 may be constructed of a steel. The steel used to construct the high temperature bus bars may be stainless steel.

The high temperature bus bars 770 may be completely located inside the hot box 802. One or more distal ends of the high temperature bus bars 770 may extend out of the hot box 802 and through the hot box floor insulation 400. For example, in one embodiment, the bus bar insulation tile 866 of the hot box floor insulation 400 are positioned at a level location 724 above the distal ends of the high temperature bus bars 770. In one embodiment, one or more proximal ends of the high temperature bus bars 770 are located in the hot box 802 and the other distal ends of the high temperature bus bars 770 are located in the foundational frame assembly 100.

The high temperature bus bars 770 may attach to the top of a fuel cell stack 790 and dive down below the hot box floor insulation 400 so the bus bars 770 exit the hot box 802 with minimal length. Minimizing the exit distance of the bus bars 770 from the hot box 802 may improve the conductivity and the life of the bus bars 770. The bus bars 770 may then travel inside the hot box floor insulation 400 to cool down by the time they enter the foundational frame assembly 100 and travel on to the power enclosure assembly 500.

In one embodiment, the high temperature bus bars 770 may be allowed to cool over a defined length 720 (e.g., a cooling length). The high temperature bus bars 770 may cool to an appropriate temperature that is well below the fuel cell operational temperature and nearer to external environment temperature (e.g., 20-40° C.). Once the high temperature bus bars 770 have sufficiently cooled, they may be connected to one or more low temperature bus bars 722 at location 782.

The low temperature bus bars 722 may be constructed of a lower grade material that are more standardized and cost effective. The cooling length 720 may depend on the temperature of the hot box 802, the ambient temperature, and/or the materials used to make the high and low temperature bus bars 770 and 722. The high temperature bus bars 770 and low temperature bus bars 722 may migrate towards and transition into the power electronics enclosure assembly 500 at location 718.

Figure 8B:
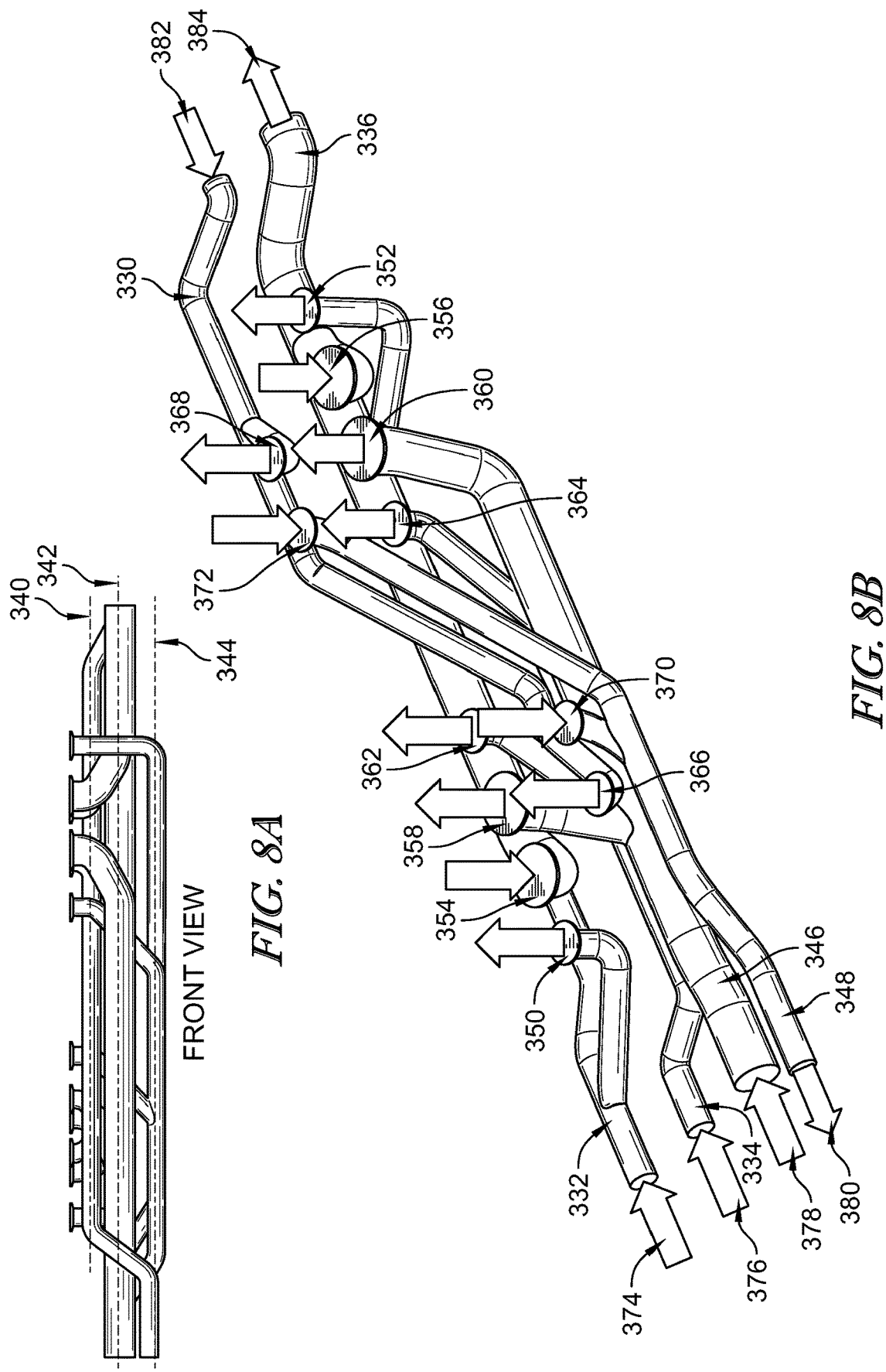
FIG. 8B is an illustration showing components of one embodiment of intermediate plumbing.
Figure 8C:
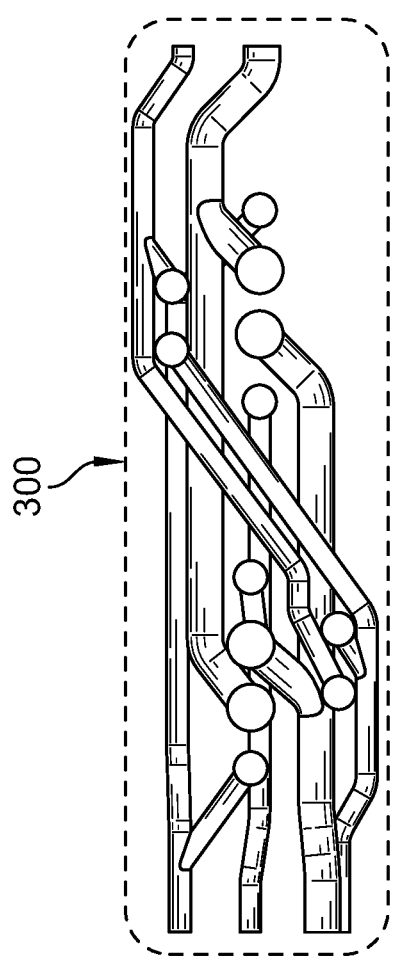
FIG. 8C is an illustration showing the top view of one embodiment of intermediate plumbing.

FIGS. 8A-8C illustrate an embodiment of the intermediate plumbing 300 that is configured to route between the frame cross members 122 of the foundational frame assembly 100, such as shown in FIG. 5. In one embodiment, the intermediate plumbing 300 may be configured in three specific "stacked" levels to allow the desired pathways to cross over one another without interfering. As shown in FIG. 8A, the first or top level 340 is configured for fuel plumbing, the second or middle level 342 is configured for air plumbing, and the third or bottom level 344 is configured for optional bypass plumbing. In an exemplary embodiment, the plumbing on the first or top level 340 is in a totally or partially different plane than the plumbing on the second or middle level 342, which is in a totally or partially different plane than the plumbing for the third or bottom level 344.

In other embodiments of the intermediate plumbing 300 routing, any of the three levels may comprise fuel plumbing, air plumbing, or bypass plumbing, as long as each level is dedicated to only one specific type of plumbing (e.g., air, fuel, or bypass). For embodiments where no bypass plumbing is utilized, a maximum of two "stacked" levels of intermediate plumbing 300 routing will be utilized. In a further embodiment of the intermediate plumbing 300 routing, multiple types of plumbing may be comprised in a single level (e.g., both the air and fuel plumbing may be located in the first or top level 340), such that not all three levels are utilized.

Referring to FIGS. 8A and 8C, the intermediate plumbing air inlet 378 may feed two fuel cell assemblies 700 in parallel at the fuel cell air heat exchanger inlets 358 and 360 through the intermediate air inlet plumbing tube 346. After flowing through the fuel cell stack assemblies 700, air may be collected at points 354 and 356 in the intermediate air outlet plumbing tube 336 and routed to the main air outlet plumbing at connection 384. In one embodiment, there may be a primary air flow path from one "C"-shaped frame rails 130 or 120 to a second "C"-shaped frame rails 130 or 120. This layout may avoid flow splitting or a "Y" shaped split to get air to both sides of the foundational frame assembly 100, and may be more reliable and cost effective.

Referring to FIG. 8B, the intermediate plumbing fuel inlet 382 may feed two fuel cell assemblies 700 in parallel at the fuel cell inlet 366 and the fuel heat exchanger inlet 368 through the intermediate fuel inlet plumbing tube 330. After flowing through the fuel cell stack of the assembly 700, fuel may be collected at points 370 and 372 in the intermediate fuel outlet plumbing tube 348. Fuel may then be routed to the main fuel outlet plumbing at connection 380.

The intermediate plumbing may optionally include air bypass tubes 332 and 334. In some embodiments, air may bypass the air heat exchanger through the air heat exchanger bypass tube 332 by taking air from the main air inlet plumbing at connection 374 and distributing it at locations 350 and 352.

In other embodiments, air may bypass the fuel cell stack assembly 700 through air fuel cell bypass tube 334 by taking air from the main air inlet plumbing at connection 376 and distributing it at locations 362 and 364. In some embodiments, the bypass plumbing may be deployed fully (as shown), partially configured, or completely omitted or removed depending on the performance and control requirements of the fuel cell utility product assembly 1000.

In one embodiment, the fuel cell utility product assembly 1000 may comprise at least one configuration of two fuel cell assemblies 700 plumbed in parallel. Two fuel cell assemblies 700 in parallel may advantageously require fewer control valves 112 while allowing the fuel cell assemblies 700 to be connected in electrical series, which increases the voltage to the power electronics assembly 500. In some embodiments, one fuel cell assembly 700 may be upside down so that the bottom of each fuel cell assembly 700 is connected to a center ground. In other embodiments, the fuel cell assemblies 700 may not be connected in series. For example, in some embodiments, each fuel cell assembly 700 could be similarly oriented (e.g., right side up), and the base of the fuel cell assemblies 700 may be at ground potential.

Figure 9:
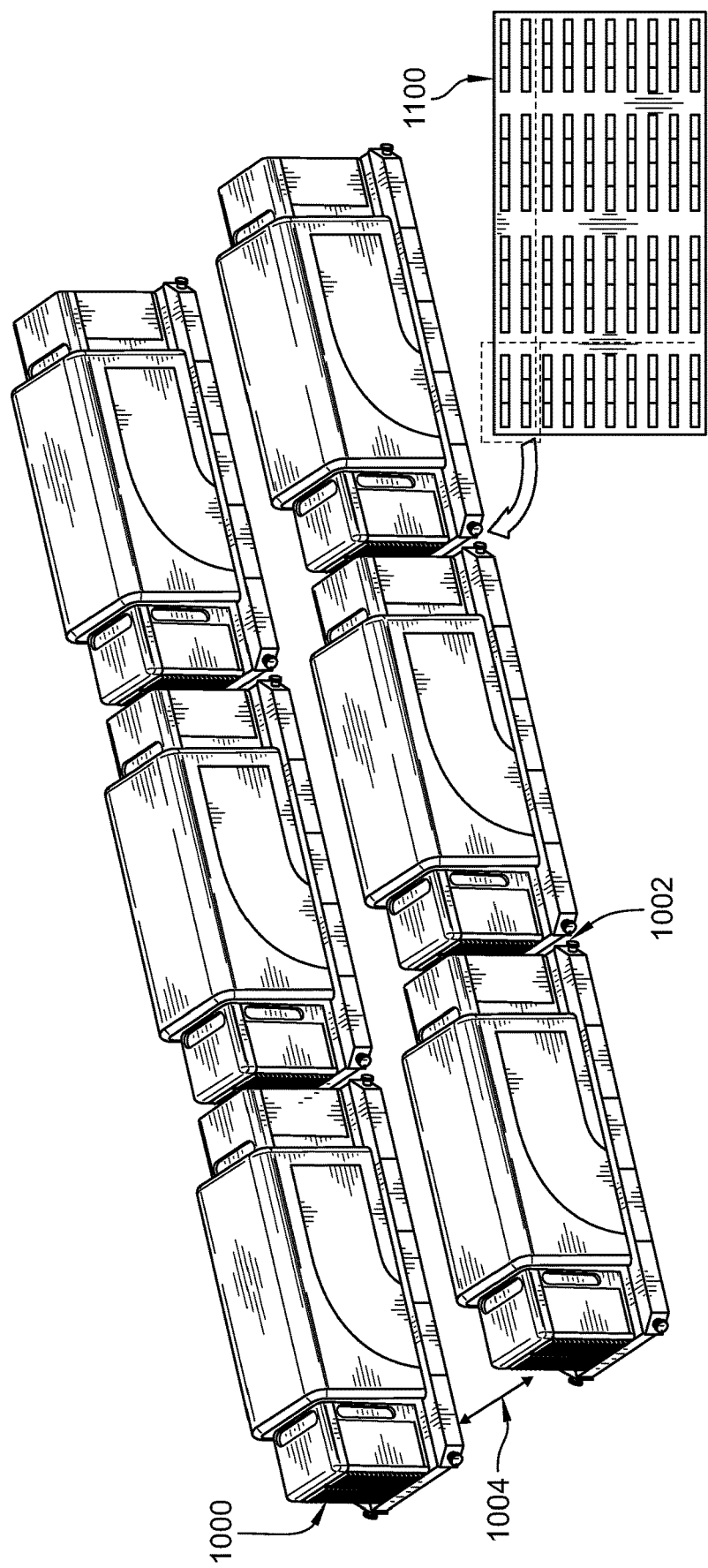
FIG. 9 is an illustration showing one embodiment of a fuel cell utility product assembly layout to create a megawatt output configuration.

FIG. 9 illustrates an embodiment of a system for increasing the power output by placing multiple fuel cell utility product assemblies 1000 together to create a megawatt output configuration 1100. Importantly, multiple units of the fuel cell utility product assembly 1000 may be configured in a layout on a portion of a surface (e.g., a land surface) to maximize the power output. The multiple units of the fuel cell utility product assembly 1000 can be arranged in one or more rows.

The fuel cell utility product assemblies 1000 are positioned to provide a first minimal distance 1002 between the ends of consecutive assemblies 1000 in the same row (e.g., end-to-end configuration). The first distance 1002 is minimized to maximize the number of assemblies 1000 that are able to be placed in one row upon a limited surface area (see FIG. 9). In addition, the assemblies 1000 are placed such that the power electronics enclosure assembly 500 or the mechanical enclosure assembly 600 of one unit is directly located next to the power electronics enclosure assembly 500 or the mechanical enclosure assembly 600 of the next assembly 1000 in the row. In one embodiment, the first distance 1002 ranges from about 3 inches to about 24 inches, including any specific or ranges of distance comprised therein.

The assemblies 1000 are further positioned having a second distance 1004 between adjacent assemblies 1000 in different rows. The second distance 1004 is correlated with the minimal distance or space required for a service provider to be able to locate and access the hot box 802 comprising the fuel cell assemblies 700, the foundational frame assembly 100, the power electronics enclosure assembly 500, the mechanical enclosure assembly 600, and/or other components or compartments of the assembly unit 1000. In one embodiment, the second distance 1004 ranges from about 2 feet to about 18 feet, including any specific or ranges of distance comprised therein. In the illustrative embodiment of FIGS. 9-11, the second distance 1004 is about 9 feet.

Figure 10:
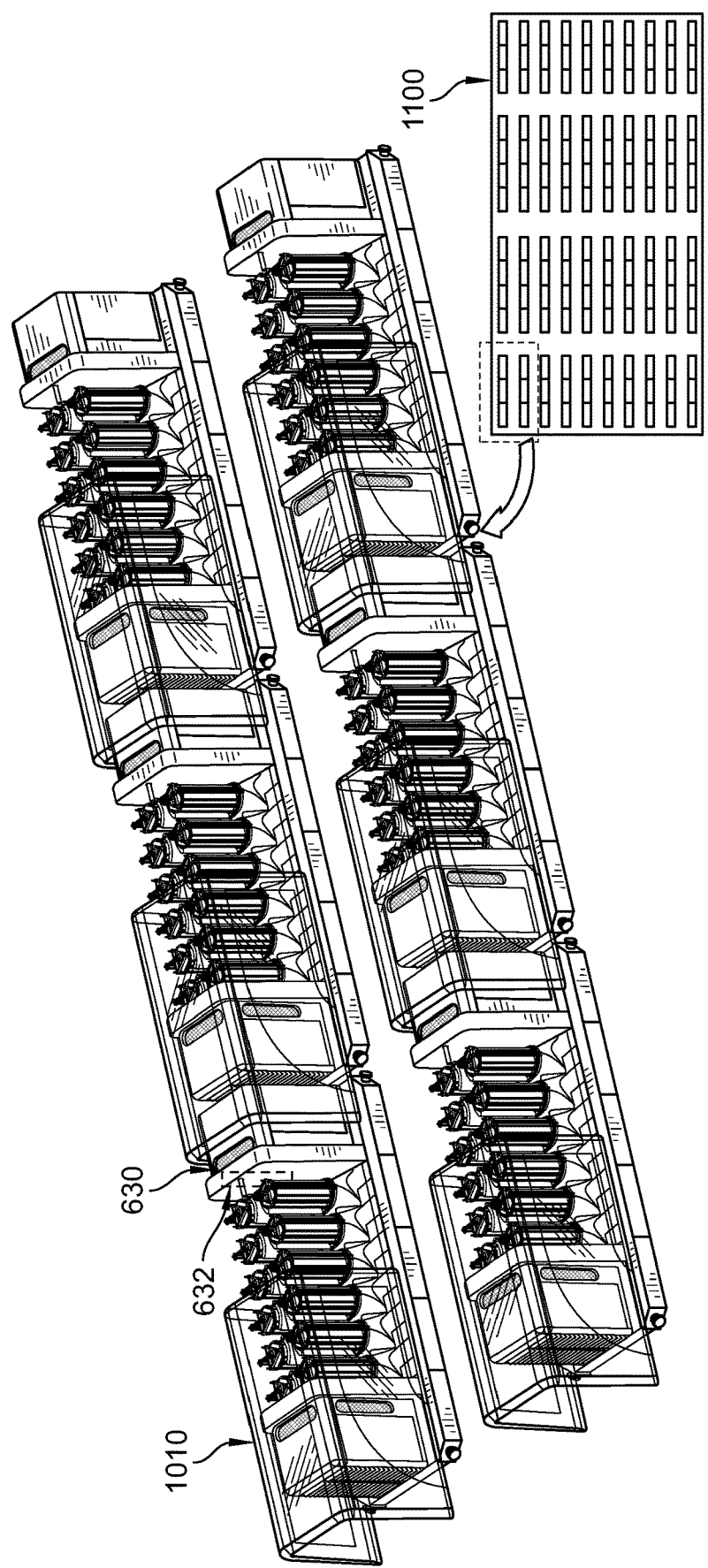
FIG. 10 is an illustration showing one embodiment of the insulation cover in a service position.

FIG. 9 illustrates multiple fuel cell utility product assemblies 1000 located in a layout configuration 1100 with the hot box insulation cover 800 in a closed position such that the hot box 802 is not exposed or immediately ready to be serviced. FIG. 10 illustrates multiple fuel cell utility product assemblies 1000 located in the layout configuration 1100 with the hot box insulation cover 800 in an open service position 1010.

The system air inlet duct or vent 632 and system air outlet duct or vent 630 may be configured to enable continuous operation of a neighboring fuel cell utility product assembly 1000 while one (or more) of the units is undergoing service, repair, and/or maintenance. As previously described, the hot box insulation cover 800 may be raised up using the one or more hot box wheel assemblies 828 sliding or rolling along the wheel tracks 166 and continuously onto the neighboring fuel cell utility product assembly 1000.

Referring back to FIGS. 5 and 10, raising the hot box insulation cover 800 before moving it ensures that no damage is done to any of the insulation seals 870, 834 and 888 or components. In some embodiments, the hot box insulation cover 800 that slides or rolls continuously onto the neighboring fuel cell utility product assembly 1000 to expose the hot box 802 and fuel cell assemblies 700 may not block or overlap the system air inlet duct or vent 632 or the system air outlet duct or vent 630 of the neighboring fuel cell utility product assembly 1000.

Removing the insulation cover 800 entirely from the fuel cell utility product assembly 1000 may take up valuable space in the limited distance between rows. Depending on the embodiment, the hot box 802 may be accessed without removing the hot box insulation cover from the foundational frame assembly 100. The hot box 802 may also be accessed without removing any panels from the insulation cover 800.

Instead, the fuel cell utility product assembly 1000 of the present disclosure enables the insulation cover 800 to be raised and slid or rolled across the wheel tracks 166 of the foundational frame assembly 100 without having to completely remove the cover 800, which is advantageous. In some embodiments, the insulation cover 800 may roll on the wheel tracks 166 and 174 on the foundational frame assembly 100. The insulation cover 800 may roll horizontally on the wheel tracks 166 in either direction to gain access to half the fuel cell assemblies 700 at any given time. This opening and rolling ability of the hot box insulation cover 800 also provides the benefit of a lifting device or means (e.g., a crane) to have overhead and/or direct access to the fuel cell assemblies 700 of the hot box 802 in order to remove and/or replace the fuel cell assemblies 700.

Figure 11:
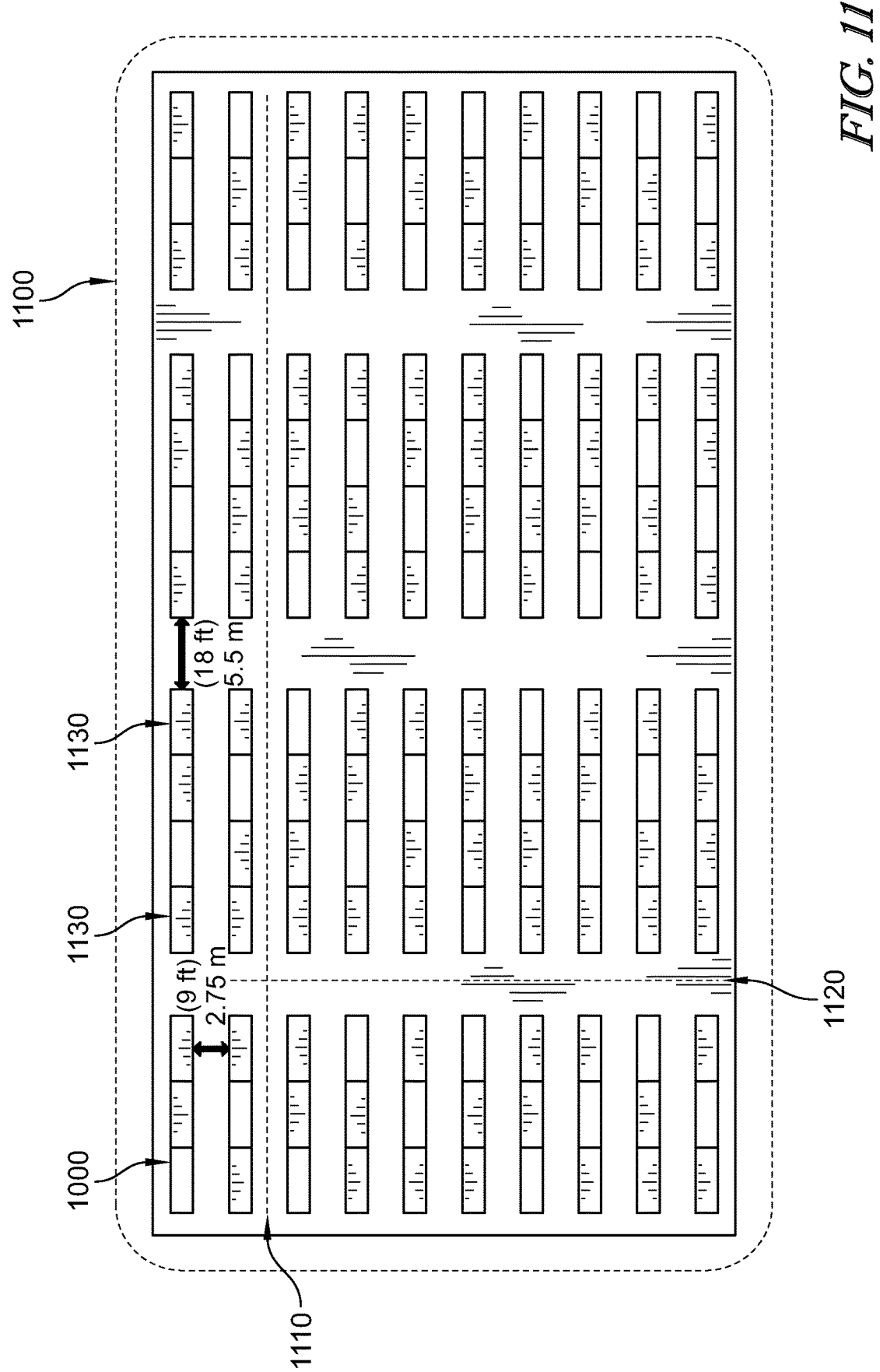
FIG. 11 is a schematic showing one embodiment of a fuel cell utility product assembly layout to create a megawatt output configuration with service pathways.

FIG. 11 illustrates one embodiment of a layout of a megawatt output configuration 1100. The fuel cell utility product assemblies 1000 may be configured end-to-end while making room for one or more service access pathways 1110 and 1120. The service pathways are configured to run both horizontally 1110 and/or perpendicularly 1120 to the fuel cell utility product assembly 1000.

In some embodiments, about 2 to about 5 fuel cell utility product assembly 1000 may be configured end-to-end to form fuel cell utility product assembly units 1130. In other embodiments, multiple such fuel cell utility product assembly units 1130 may be aligned horizontally 1110 and/or perpendicularly 1120. In some other embodiments, such multiple fuel cell utility product assembly units 1130 may be separated from adjacent fuel cell utility product assembly units 1130 by a distance of about 5 ft. to about 20 ft. from each other, including any specific or range of distances comprised therein. For example, in one embodiment shown in FIG. 11, the distance may be from about 7.5 to about 20 ft., from about 9 ft. to about 18 ft., from about 10 ft. to about 15 ft.

In one embodiment, a megawatt output configuration 1100 may enable a high-power density while allowing easy service and/or replacement of parts or components of the fuel cell utility product assembly 1000 in the field. In other embodiments, multiple fuel cell utility product assembly 1000 may be configured to be organized in a different layout with or without horizontal 1110 and/or perpendicular 1120 service access pathways.

In one embodiment, a method of operating a fuel cell utility product assembly 1000 may include configuring a fuel cell utility product assembly 1000, including a foundational frame assembly 100, a hot box 802 comprising one of more fuel cell assemblies 700, a power electronics enclosure assembly 500, a mechanical enclosure assembly 600, a network of primary air and fuel plumbing 200, and a network of intermediate air and fuel plumbing 300 to generate power (e.g., electricity). The method of operating a fuel cell utility product assembly 1000 may further include an insulation cover 800 covering the hot box 802. The hot box insulation cover 800 may move, roll, or slide in a horizontal direction to enable and/or increase access to the fuel cell assemblies 700 or service, repair, maintenance, etc. The network of primary air and fuel plumbing 200 and the network of intermediate air and fuel plumbing 300 may be enclosed in "C"-shaped rails of the foundational frame assembly 100.

In one embodiment, the method of operating a fuel cell utility product assembly 1000 may include operating the fuel cell utility product assembly 1000 in association with one or more other fuel cell utility product assembly 1000. The method of operating a fuel cell utility product assembly 1000 may include more than one fuel cell utility product assemblies 1000 organized in a layout with or without horizontal 1110 or perpendicular 1120 service access pathways.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:
1. A solid oxide fuel cell utility product assembly comprising:
   a foundational frame assembly comprising a frame rail;
   a hot box cover removably supported by the foundational frame assembly positioned below the hot box cover to define a hot box area;

one or more fuel cell assemblies housed in the hot box area and configured to produce electricity;

a plumbing system configured to supply a fuel or an oxidant to the one or more fuel cell assemblies, wherein at least a portion of the plumbing system is routed through and is protected by a longitudinal section of the frame rail.

2. The solid oxide fuel cell utility product assembly of claim 1, wherein the hot box cover comprises three layers, an inner structural layer, an insulation layer provided over the inner structural layer, and an outer hot box shell.

3. The solid oxide fuel cell utility product assembly of claim 2, further comprising a layer of floor insulation comprising one or more segmented tiles provided between the frame assembly and the one or more fuel cell assemblies.

4. The solid oxide fuel cell utility product assembly of claim 2, further comprising a seal.

5. The solid oxide fuel cell utility product assembly of claim 4, further comprising a lifting mechanism that moves the hot box cover relative to the frame assembly without damaging the seal to provide access to the hot box area and to the one or more fuel cell assemblies housed therein.

6. The solid oxide fuel cell utility product assembly of claim 5, wherein the lifting mechanism comprises a first wheel assembly, which is located on a first side of the hot box cover, and a second wheel assembly, which is located on a second side of the hot box cover, wherein the first and second wheel assemblies are configured to move the hot box cover vertically.

7. The solid oxide fuel cell utility product assembly of claim 2, wherein the hot box cover further comprises an outer layer over the insulation layer, wherein the outer layer provides the hot box area with a weathertight seal.

8. The solid oxide fuel cell utility product assembly of claim 2, further comprising:
 a first insulating wall attached to a first side of the insulation layer of the cover; and
 a second insulating wall attached to a second side of the insulation layer of the cover,
 wherein the second insulating wall is opposite the first insulating wall.

9. The solid oxide fuel cell utility product assembly of claim 1, wherein the fuel cell assemblies comprise at least one fuel cell stack support base and one or more thermal isolation devices, wherein each thermal isolation device is provided between the frame assembly and the fuel cell support base.

10. The solid oxide fuel cell utility product assembly of claim 9, wherein the fuel cell stack support base comprises a single cast structure.

11. The solid oxide fuel cell utility product assembly of claim 1, wherein at least two fuel cell assemblies are plumbed in parallel.

12. The solid oxide fuel cell utility product assembly of claim 1, wherein the frame rail includes a main body and first and second ledges extending from the main body at first and second locations, respectively, forming a "C" shape that defines the longitudinal section of the frame rail.

13. The solid oxide fuel cell utility product assembly of claim 12, wherein the portion of the plumbing system routed through the longitudinal section includes a primary plumbing for supplying the fuel to the one or more fuel cell assemblies.

14. The solid oxide fuel cell utility product assembly of claim 12, wherein one or more primary air control valves or one or more primary fuel control valves are housed in the longitudinal section of the frame rail.

15. The solid oxide fuel cell utility product assembly of claim 1, further comprising one or more bus bars, where each bus bar includes a first material, which provides a relative high temperature resistance and that engages with the fuel cell assemblies within the hot box, and a second material, which provides a relative lower temperature resistance and that extends outside the hot box.

16. A hot box assembly for a solid oxide fuel cell assembly, the hot box assembly comprising:
 a floor comprising an insulative material;
 a cover disposed above the floor to together define a hot box area configured to receive one or more fuel cells of the fuel cell assembly, wherein the cover includes an insulative material or an insulation layer;
 a moving assembly operatively coupled to the cover and configured to move the cover relative to the floor, and
 a plumbing system routed through a longitudinal section of a frame assembly located at the floor.

17. The hot box assembly of claim 16, wherein the moving assembly comprises a first wheel assembly, which is located on a first side of the cover, and a second wheel assembly, which is located on a second side of the cover, wherein the first and second wheel assemblies are configured to move the cover horizontally to enable access to the hot box area.

18. The hot box assembly of claim 16, further comprising a seal to couple the cover to a supporting structure on which the hot box assembly is placed.

19. The hot box assembly of claim 16, wherein the hot box assembly is comprised in a fuel cell utility product assembly.

20. The hot box assembly of claim 16, further comprising one or more segmented tiles on the floor.

* * * * *